(12) United States Patent
Corrigan et al.

(10) Patent No.: US 9,630,545 B1
(45) Date of Patent: Apr. 25, 2017

(54) APPARATUS AND SYSTEM FOR FACILITATING LOADING AND UNLOADING CARGO FROM CARGO SPACES OF VEHICLES

(71) Applicant: JKC Development, Inc., Burbank, IL (US)

(72) Inventors: J. Kevin Corrigan, Burbank, IL (US); Colm K. Corrigan, Burbank, IL (US)

(73) Assignee: JKC Development, Inc., Burbank, IL (US)

( * ) Notice: Subject to any disclaimer, the term of this patent is extended or adjusted under 35 U.S.C. 154(b) by 155 days.

(21) Appl. No.: 14/739,845

(22) Filed: Jun. 15, 2015

Related U.S. Application Data

(63) Continuation-in-part of application No. 13/344,883, filed on Jan. 6, 2012, now Pat. No. 9,056,577.

(60) Provisional application No. 61/430,297, filed on Jan. 6, 2011.

(51) Int. Cl.
| | |
|---|---|
| *B60P 1/38* | (2006.01) |
| *B60P 1/44* | (2006.01) |
| *B64D 9/00* | (2006.01) |

(52) U.S. Cl.
CPC ........ *B60P 1/38* (2013.01); *B60P 1/44* (2013.01); *B64D 2009/006* (2013.01)

(58) Field of Classification Search
CPC .... B60P 1/02; B60P 1/006; B60P 1/36; B60P 1/38; B60P 1/26; B60P 1/003; B60P 1/52; B60P 3/08; B60P 3/07; B60P 3/1033; B60P 3/1066; B64D 9/00; B64F 1/32; B65F 3/28; B65F 3/201; B65F 3/20; B61D 3/18; B61D 3/20; A01G 23/006; B65G 67/00; B65G 13/12; B65G 47/54; B65G 47/261; B65G 47/53; B65G 25/02; B62B 3/148; B62D 25/2054

See application file for complete search history.

(56) References Cited

U.S. PATENT DOCUMENTS

| | | |
|---|---|---|
| 2,605,914 A | 8/1952 | Hala |
| 2,666,566 A | 1/1954 | Schneider et al. |
| 2,678,139 A | 5/1954 | Gildersleeve |
| 3,346,132 A | 10/1967 | Duszka |
| 3,369,684 A | 2/1968 | Ford |
| 3,642,154 A | 2/1972 | Duszka |

(Continued)

OTHER PUBLICATIONS

Tommy Gate—Liftgates—Rail Gate Series www.tommygate.com/gatemodels_rail.asp (Oct. 12, 2009) 1 pp.

(Continued)

*Primary Examiner* — Glenn Myers
(74) *Attorney, Agent, or Firm* — Banner & Witcoff, Ltd.

(57) ABSTRACT

A cargo space includes a rear lift gate moveable between opened and closed positions to allow movement of palletized containers into and out of the cargo space. The cargo space has a substantially horizontal floor with first and second sets of laterally spaced, parallel, longitudinal tracks. The tracks extend from the front to the lift gate at the rear of the cargo space. At least one set of tracks is positioned transverse to the longitudinal tracks. The tracks slidably support cargo container pallets. A system of actuators, guides and locks enable programmed movement of the pallets along the tracks into and out of the cargo space as well as within the cargo space.

23 Claims, 17 Drawing Sheets

(56) References Cited

U.S. PATENT DOCUMENTS

| | | |
|---|---|---|
| 3,853,230 A | 12/1974 | Schultz |
| 3,884,374 A | 5/1975 | Swallow, Jr. |
| 3,899,092 A | 8/1975 | Nordstrom |
| 4,345,869 A | 8/1982 | King |
| 4,612,996 A | 9/1986 | Wolf et al. |
| 4,640,657 A | 2/1987 | Moore et al. |
| 4,642,018 A | 2/1987 | Leroux et al. |
| 4,684,311 A | 8/1987 | Dickson-Wright et al. |
| 4,715,765 A | 12/1987 | Agnoff |
| 4,909,378 A | 3/1990 | Webb |
| 5,213,467 A | 5/1993 | Harms |
| 5,511,922 A | 4/1996 | Sekiguchi et al. |
| 5,525,026 A | 6/1996 | DeMonte et al. |
| 5,542,809 A | 8/1996 | Kita et al. |
| 5,605,427 A | 2/1997 | Hammond |
| 5,794,416 A | 8/1998 | Rahman |
| 6,112,917 A | 9/2000 | Baker et al. |
| 6,202,569 B1 | 3/2001 | Bailey et al. |
| 6,585,473 B2 | 7/2003 | Turner |
| 6,746,199 B2 | 6/2004 | Carawan et al. |
| 6,814,214 B2 | 11/2004 | Warlow et al. |
| 6,935,248 B2 | 8/2005 | Warlow et al. |
| 8,561,946 B2 | 10/2013 | Barmichev et al. |
| 2011/0176903 A1* | 7/2011 | Schulze ................ B64D 9/003 414/800 |

OTHER PUBLICATIONS

Tommy Gate—Liftgates—Rail Gate Series—Platforms—www.tommygate.com/platforms_rg_bf.asp (Oct. 19, 2010) 1 pp.

Tommy Gate—Liftgates—Rail Gate Series—Features & Accessories—www.tommygate.com/features_rg_bf.asp (Oct. 12, 2009) 2 pp.

Waltco Lift Corp. Liftgates for trucks—www.waltcoliftgates.com/site.cfm/home.cfm (Oct. 19, 2010) 5 pp.

Maxon Lift www.maxonlift.com (Oct. 19, 2010) 2 pp.

Anthony Liftgates, Inc.—www.anthonyliftgates.com (Oct. 19, 2010) 2 pp.

Leyman Lift Gates—www.leymanlift.com/home.htm (Oct. 19, 2010) 2 pp.

\* cited by examiner

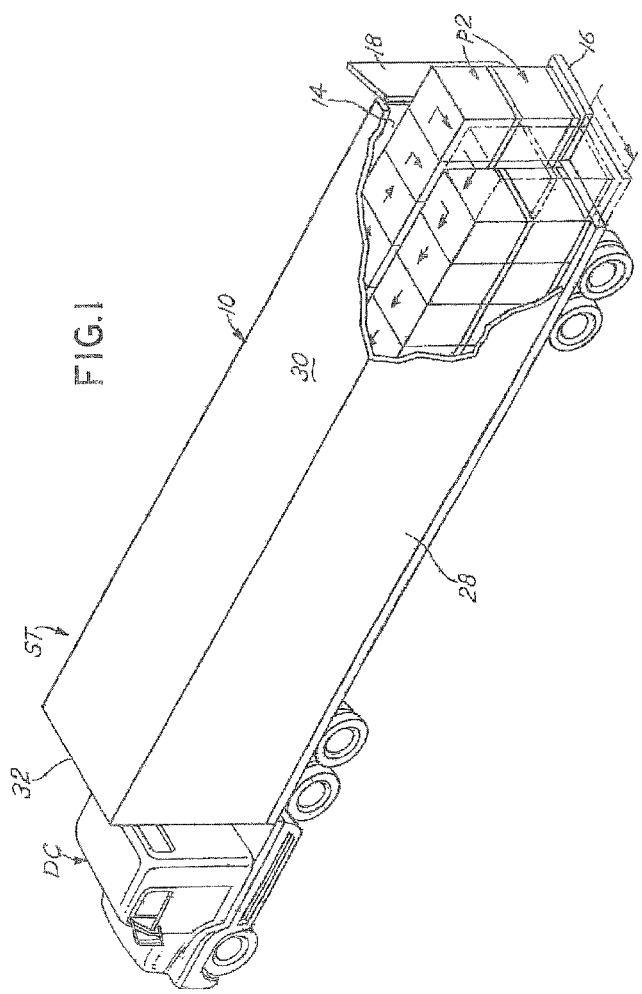

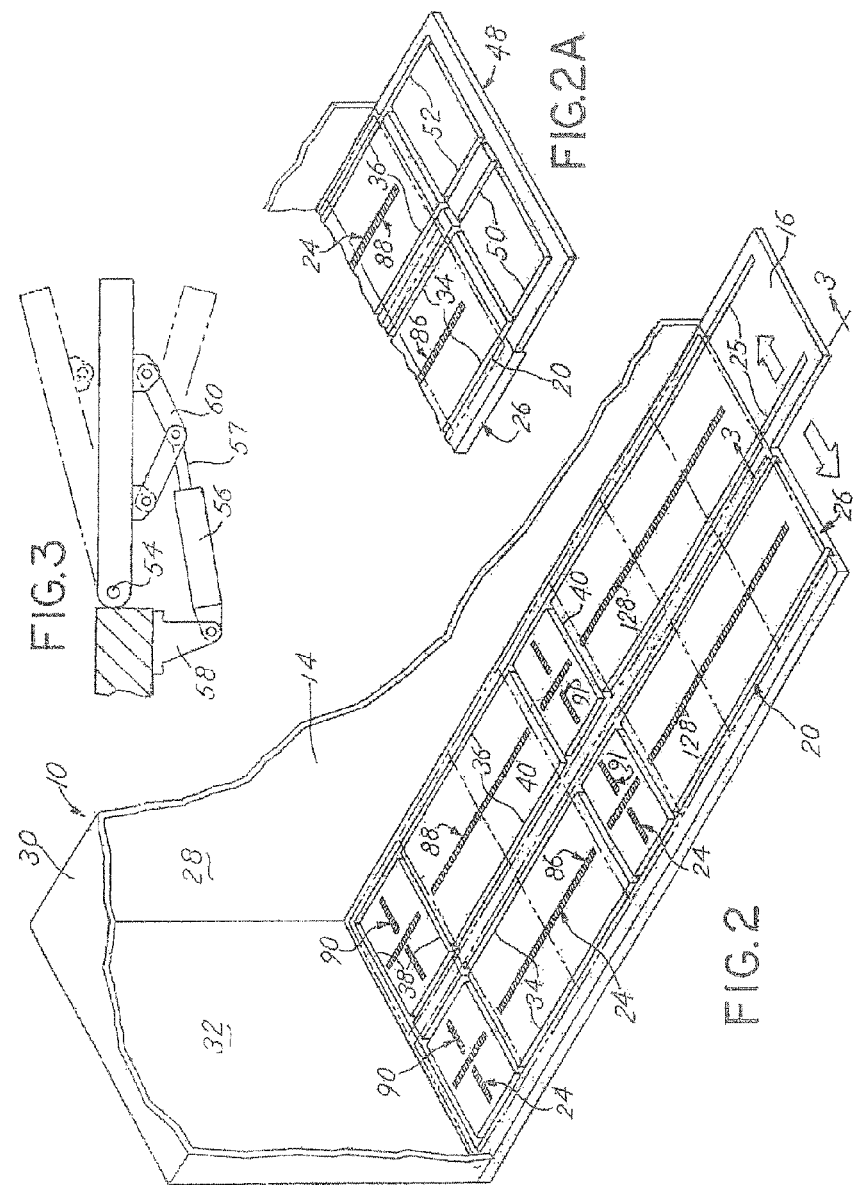

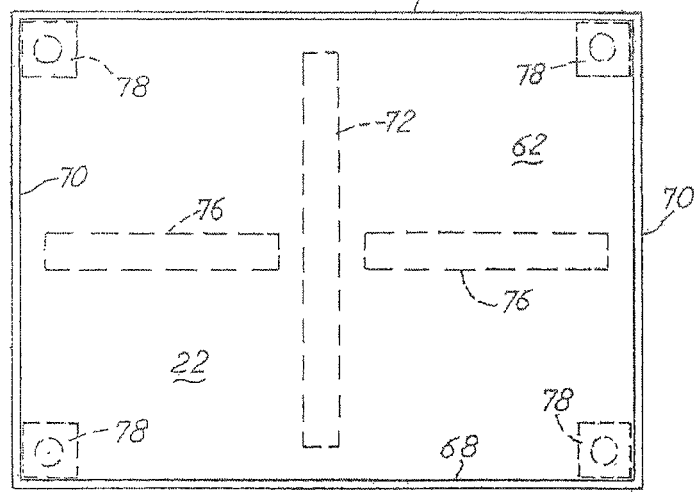
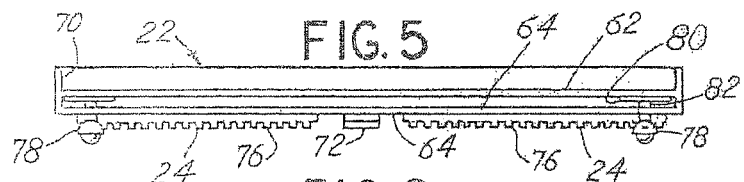
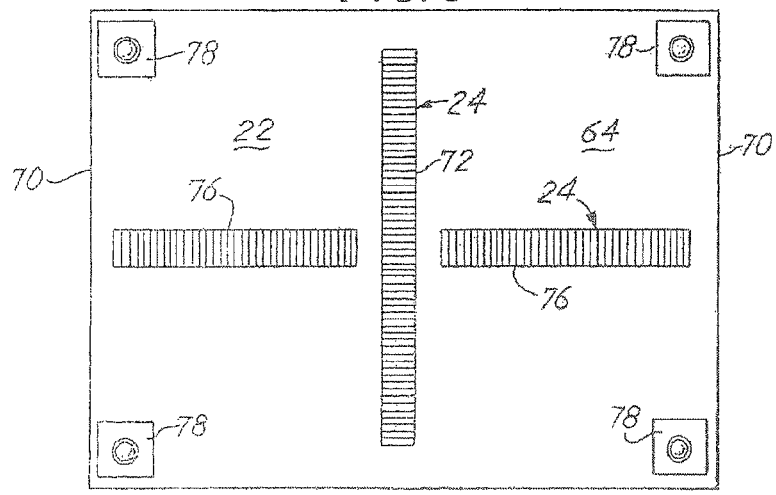

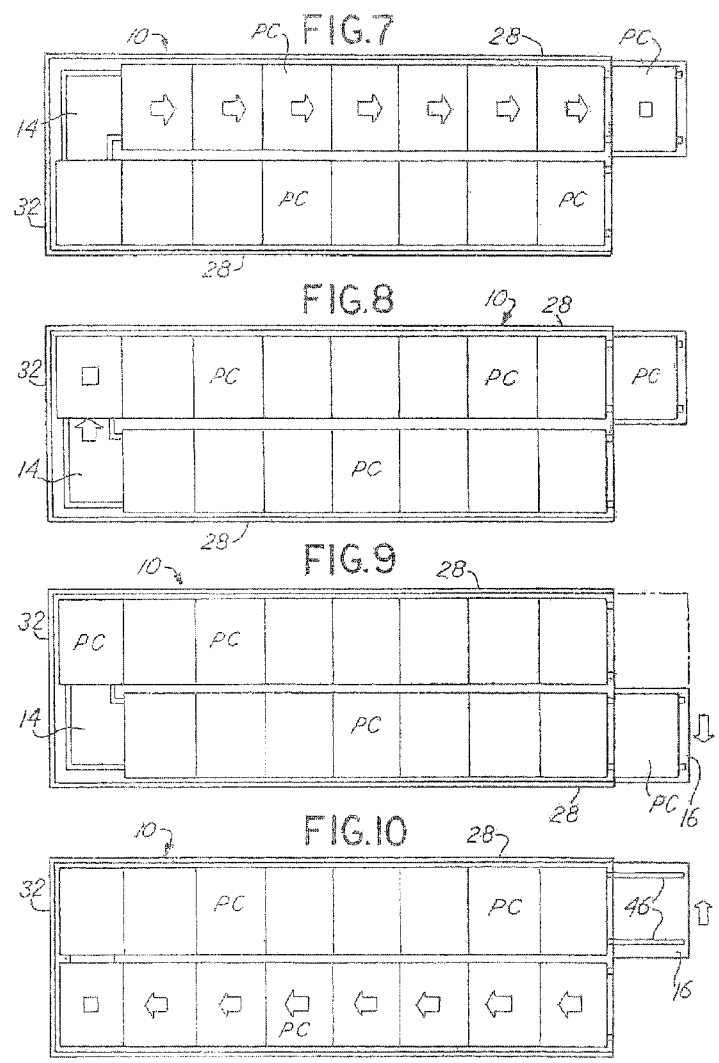

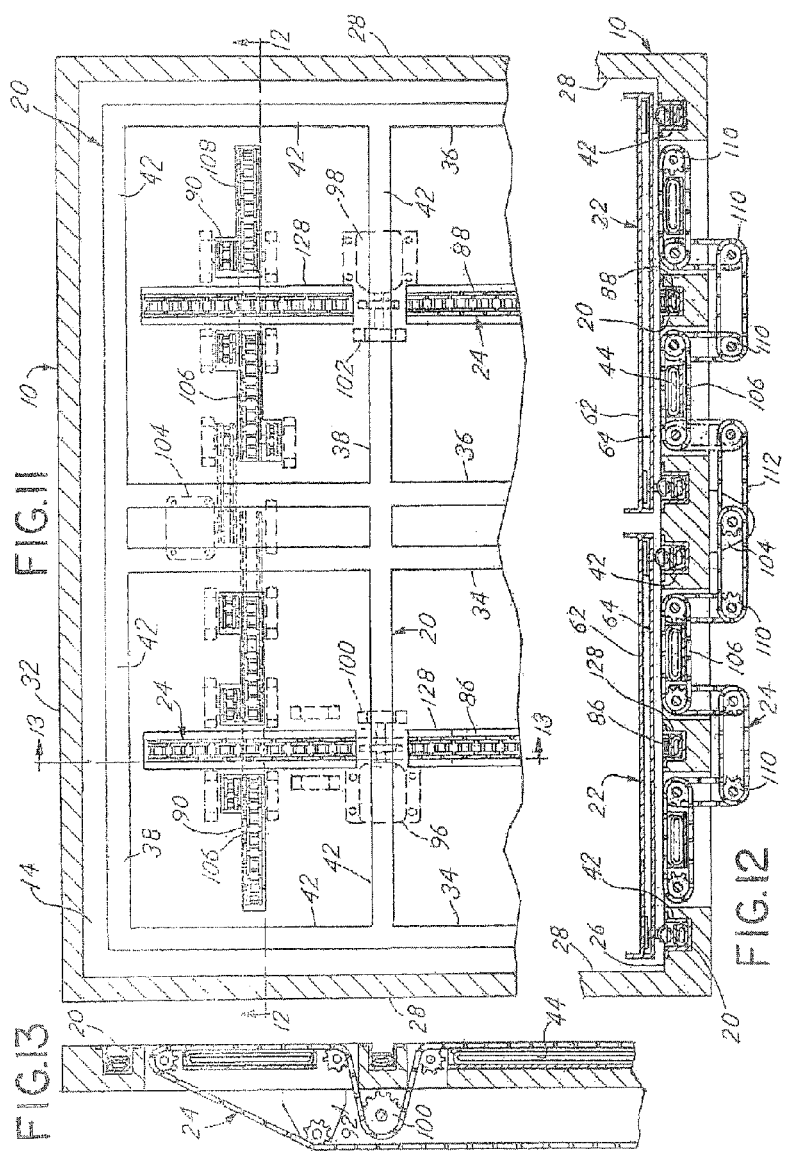

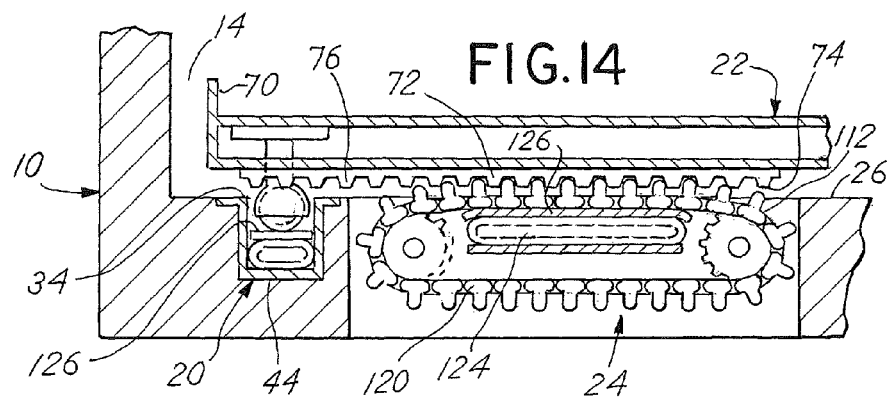
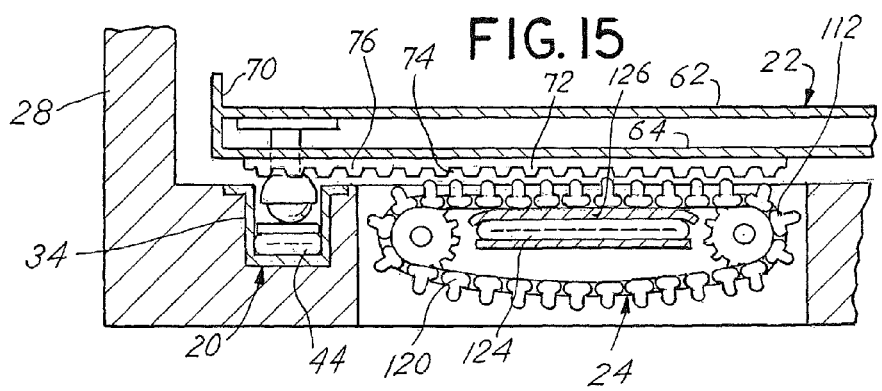
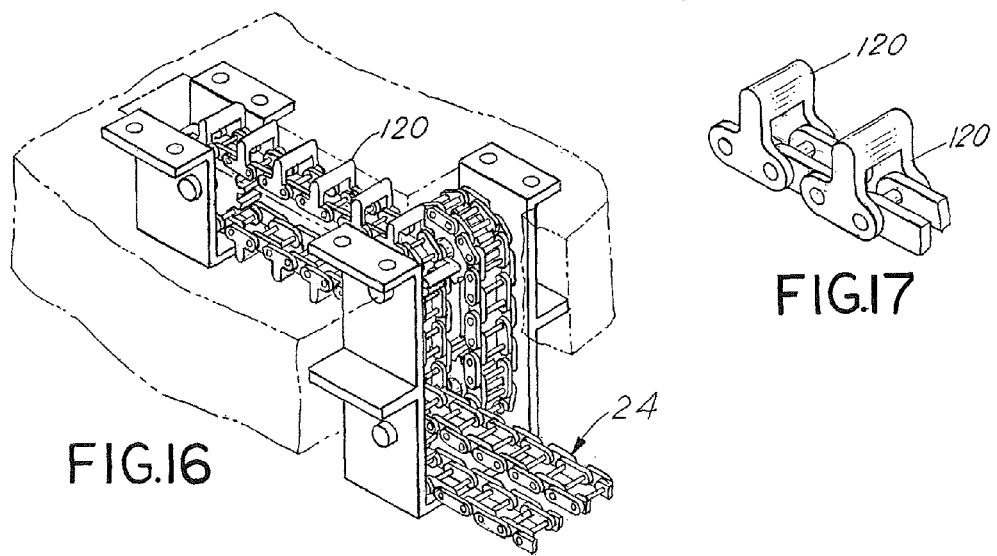

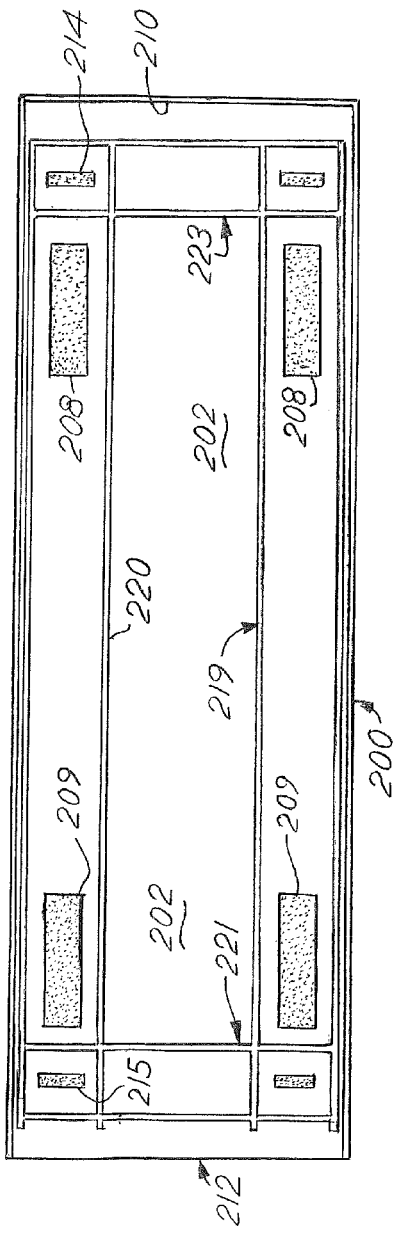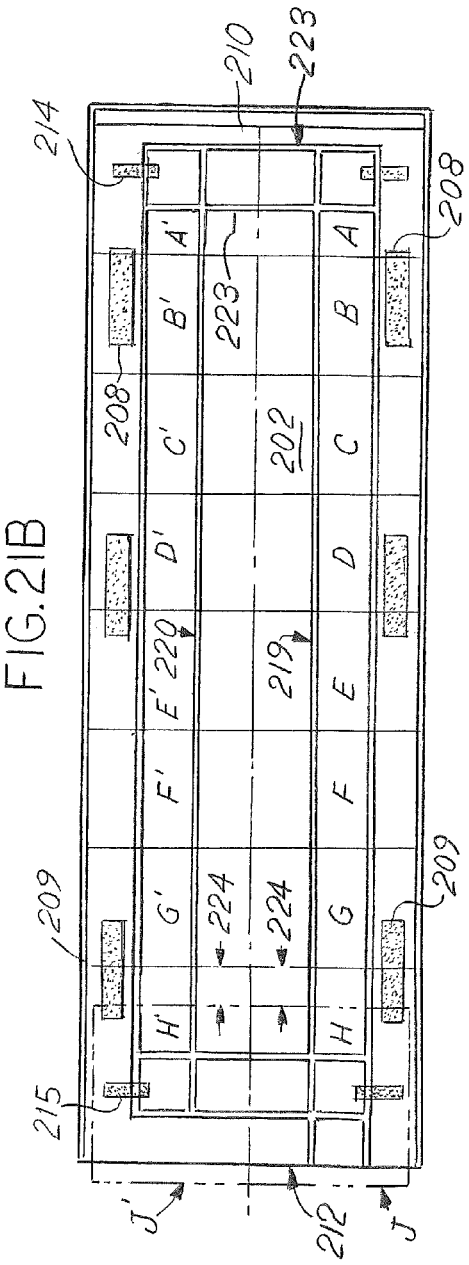
FIG.21A
FIG.21B

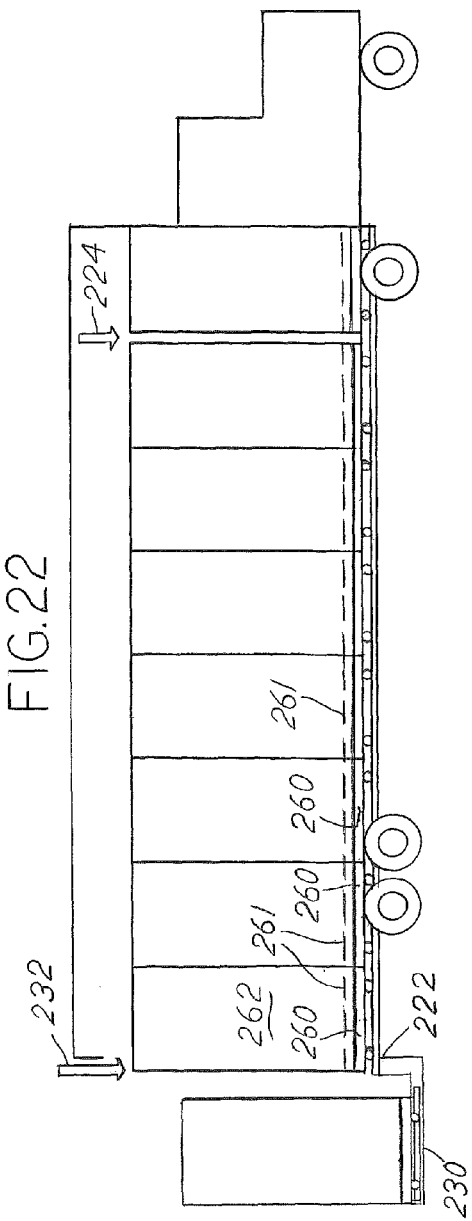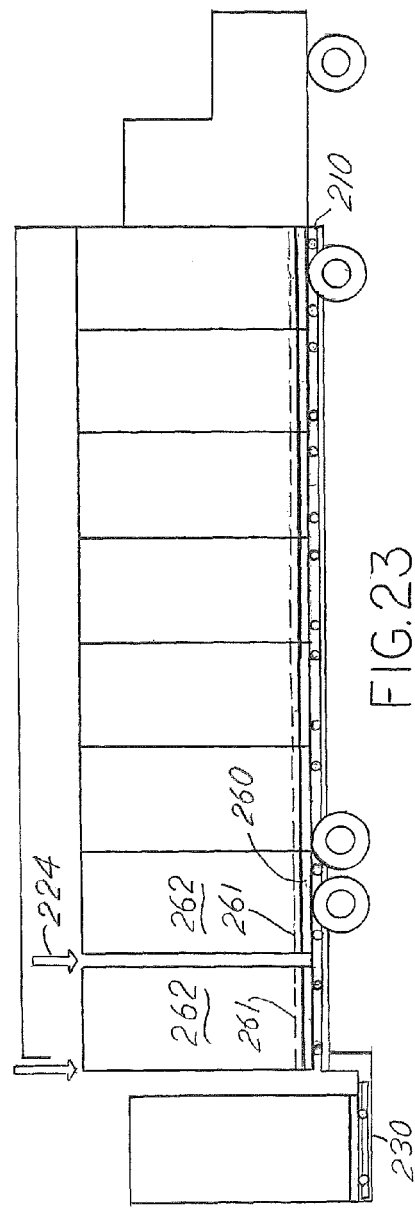

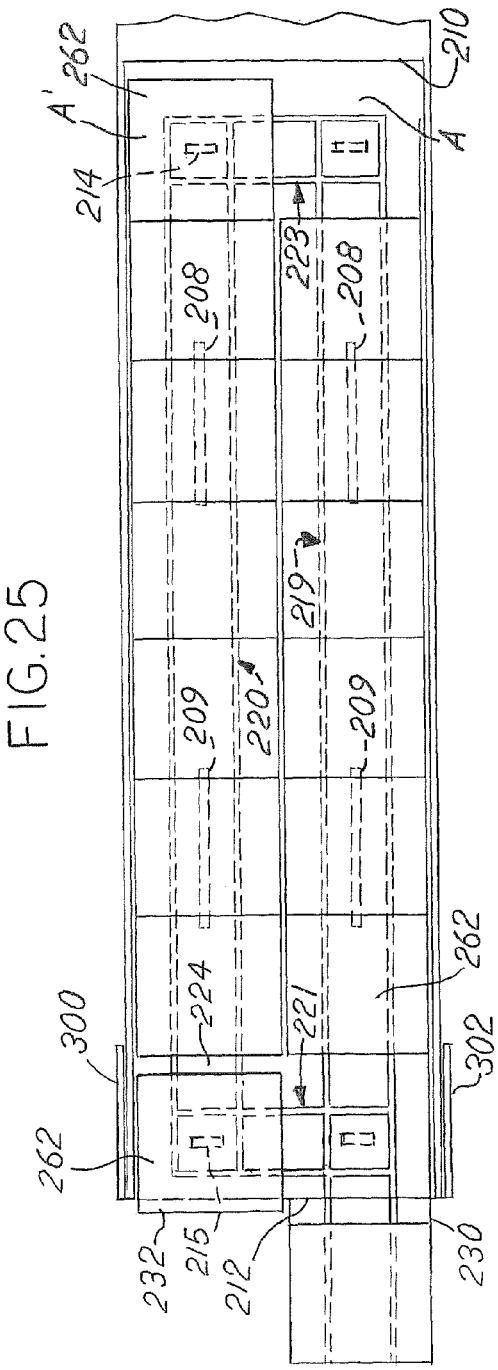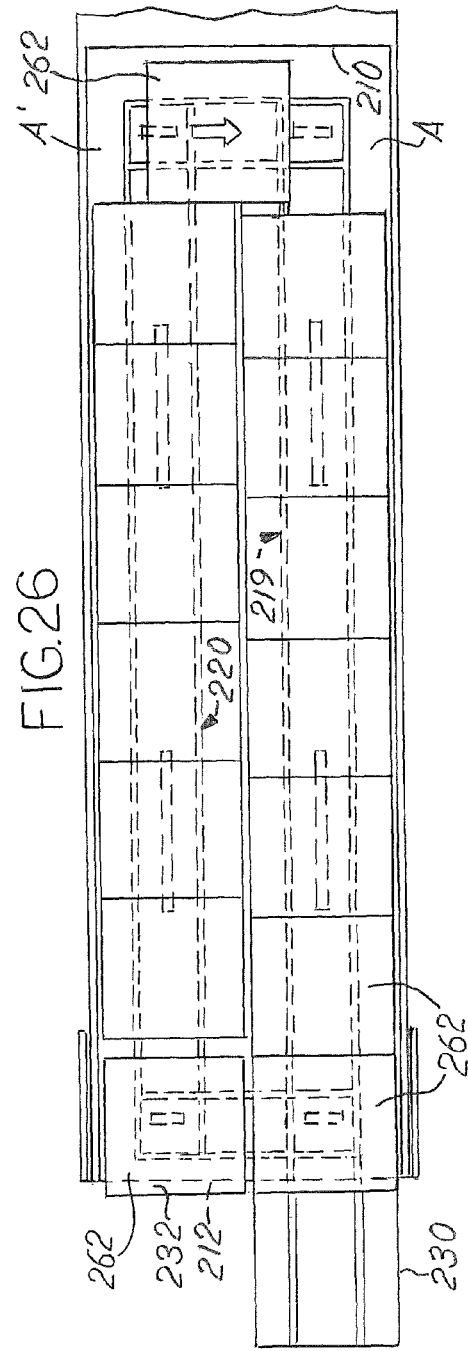

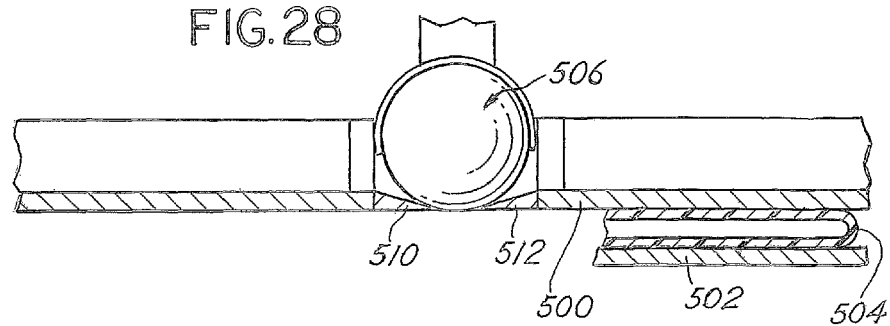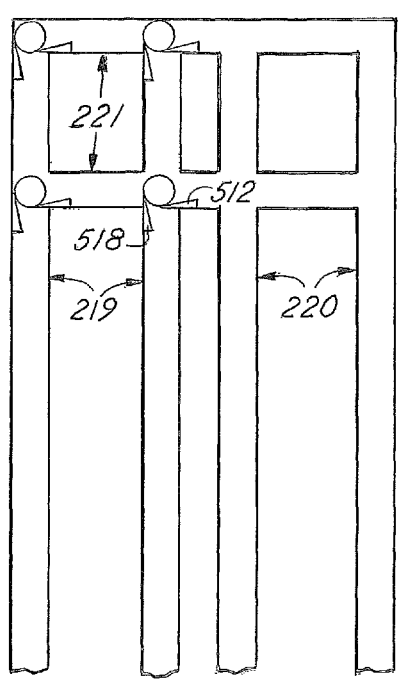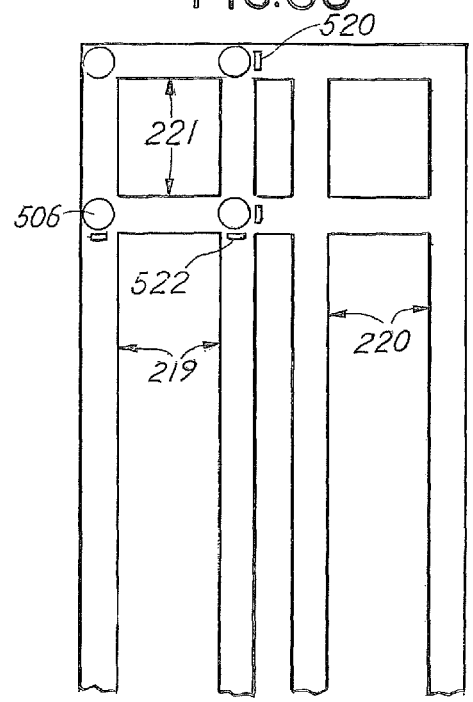

APPARATUS AND SYSTEM FOR FACILITATING LOADING AND UNLOADING CARGO FROM CARGO SPACES OF VEHICLES

CROSS REFERENCE TO RELATED APPLICATIONS

This is a continuation-in-part of utility application Ser. No. 13/344,883 filed Jan. 6, 2012 entitled "Apparatus and System for Facilitating Loading and Unloading Cargo From Cargo Spaces of Vehicles" and is also based on provisional application Ser. No. 61/430,297 filed Jan. 6, 2011 entitled "Apparatus and System for Facilitating Loading and unloading Cargo from Cargo Spaces of Vehicles" for which priority is claimed.

BACKGROUND OF THE INVENTION

This invention relates to an apparatus and a system for facilitating loading and unloading of packaged or containerized goods to and from cargo spaces utilized by a variety of delivery vehicles.

In today's society, there is wide use of vehicles of various types for loading and shipping goods from one or more locations to a delivery location or locations. The shipping industry has a wide variety of needs relating to loading products into a cargo space and ultimately unloading the product at the desired location. Some product shipments involve merely loading goods of the same type at one location and unloading all the goods at another location. In the trucking industry, this is known as TL (Truckload) trucking. However, other shipping needs, such as over the road trucking and certain local delivery trucking companies, require palletized or containerized products that do not have a truckload of the same products in the same cargo space. Such shipping requirements may require multiple pick ups of various products at various locations with drop offs of the products at multiple destinations. This is known as LTL Trucking (Less Than Truckload). Retailers often need to have loading of the cargo space of a vehicle at one or more locations and require shipping directly to multiple locations, such as grocery stores, businesses, and even households.

Most types of shipping needs are often difficult to be accomplished in an efficient and time effective manner. In the over the road and regional trucking industry, for example, there is a need for improvements in both loading and unloading systems. It is always desired to load and unload cargo to and from the cargo space of a truck in a time effective manner. It is also desirable to provide a system and apparatus for organizing loads for sequential pick ups and drop offs. A system for effecting an off loading and loading sequence of a truckload from and to a cargo space is needed to provide improved efficiency and time savings in the trucking industry.

As one example, of the need for improvements in the loading and unloading of trucks, the food industry, in particular, would benefit financially from greater efficiency in loading and unloading pallets with containers of fresh and/or frozen food products to and from the cargo spaces of trailers used by the trucking industry. A container identification is provided for each pallet having containers thereon. In a given month, if a given trailer truck could make even one additional round trip starting at the home base, with multiple pick-ups and drop-offs at various sites, and returning back to the home base, significant monetary savings would result. The present invention is intended to provide an apparatus and a system which results in a highly efficient loading and unloading of cargo spaces of various types of vehicles.

The trucking industry, as represented by the American Trucking Association, is considered a major beneficiary of the inventive apparatus and system to be hereinafter described. In addition to the trucking industry, the invention is intended to be widely used by retailers, wholesalers, exporters, hotel and restaurant businesses, various business organizations and associations, and package and grocery delivery businesses. The U.S. government and state governments could well benefit from the present invention.

Benefits for the over-the-road, regional and local LTL trucking industry include: (1) eliminating or minimizing the need to completely unload and reload each trailer at a dock in the cross docking process; (2) eliminating the need to remove pallets at the rear of a trailer which prevent the unloading of pallets further in. A warehouse or dock will charge at least $50.00 per pallet for the removal and reloading of such pallets; (3) minimizes problems and costs created by product refusals; and (4) enables taking on additional forward freight or backload freight on outbound trips.

Further, significant environmental savings may result from reduced fuel use (55 billion gallons of fuel are believed to be used annually by the trucking industry). This provides obvious environmental benefits.

Although the greatest beneficiaries of the present invention may be the trucking industry, the general concept provided by the invention may also be adapted for box trucks and vans engaged in the package and grocery delivery industries. In use by the package and grocery delivery industries, the inventive concepts remain substantially the same, although dimensional changes would be required.

SUMMARY

Although any vehicle commonly used for shipping a large load of cargo may be utilized, the invention herein is particularly directed to use with vehicles having a large cargo space, such as a trailer of an over the road or regional LTL tractor trailer combination. The over the road vehicles commonly contain multiple cargo containers having various goods stored in palletized containers. The invention herein is particularly useful when the separate palletized containers are picked up from and dropped off at multiple locations.

The inventive apparatus and system have an enclosed cargo space commonly including a front side, a pair of laterally spaced sides, a rear side and a roof. The rear side generally comprises a door that is moveable between opened and closed positions to allow movement of palletized containers in and out of the cargo space. The cargo space further has a substantially horizontal floor enclosed between the front side, the laterally spaced sides and a rear door. The system and apparatus include first and second sets of laterally spaced and opposed tracks that are securely mounted along the floor of the cargo space. The elongated tracks are positioned on the floor generally parallel to and extending along each of the side walls from the front side to the rear of the cargo space. Furthermore, at least one additional set of tracks is positioned transverse to the elongated tracks and is operably positioned relative to both the first and second sets of laterally spaced elongated tracks for transfer of palletized containers between the sets of laterally spaced tracks.

In an embodiment of the apparatus, more than three sets of parallel tracks may be utilized. For example, four sets of intersecting tracks may be installed in sections on a trailer floor. Two such sets are arrayed in a parallel arrangement extending from the front, or near the front, of the interior platform of a trailer to the rear. These two sets of tracks are mounted side by side and comprise uniformly spaced tracks. Two, and on occasion, more additional sets of tracks extend transversely between the parallel tracks running between the front and rear of the interior trailer floor or platform. Typically, a first set is provided at the forward end of the trailer floor and a second set is provided at the rear end of the trailer floor accessible through a gate or door at the rear end of the trailer.

With such an arrangement, a mechanical stop or brake is provided in an outer wall of the trailer or of the transverse track or rail adjacent the intersection or position with respect to the intersection of the elongated track extending longitudinally between the front and the rear of the trailer floor. The stop prevents undesired or accidental movement of palletized containers from the tracks or rails of the tracks. Typically, a parallel set of tracks comprise rails which are centered approximately two feet apart. The track spacing may vary depending upon pallet size. The container supports may include supports which interconnect to the front and side walls of the trailer. The containers or pallets for the containers may also be interlocked to the floor of the trailer. The housing for the tracks is typically secured to a support cross means below the trailer floor or a kingpin plate which forms a portion of the trailer floor at the front of the trailer.

The material for making the housing for the tracks is typically a stainless steel, carbon fiber, or other light durable material which will have a tensile strength capable of supporting a concentrated minimum weight of 2,000 or more pounds on each four foot square section within the trailer housing. Either side or both sides of the elongated or longitudinal and transverse track housing typically comprises a platform typically in the range of 6-8 inches in width made, for example, from high density plastic or aluminum secured to the trailer floor. The housing will have equal height, spaced side walls that will provide support for pallet carriages or pallets with containers thereon when in a resting position supported on the trailer floor.

In an embodiment of the track housing construction, a series of small inflatable air bags or bladders connected, for example, to the air compressor of the transport vehicle or truck or to an air tank secured to the trailer will be provided. Immediately above the air bags or bladders, the track housing will, or may, include a stainless steel plate or track of sufficient width to contain and permit free rolling movement of stainless steel rails and which is subject to elevation on casters mounted to the underside of a pallet, carriage or container. The inflatable bags or bladders are positioned beneath the track and upon inflation will cause the plate or track to elevate and engage the pallet carriage wheels or casters and permit their free rolling movement along the elevated tracks. Thus, the track housing and its contents; namely, the air bags and elevatable plate or track, along with the platform upon which the wheels would typically rest in an immovable position, are installed and secured in sections within the trailer compartment. The track, thus, will have a strut or channel design and thereby provides a pathway for retaining or confining the pallet carriage casters or wheels within the strut or channel defining the track.

Double acting pneumatic linear actuators operating transversely within the trailer may be mounted on the steel kingpin plate at the front corner and in the center of the set of transverse tracks. Each linear actuator is designed to provide a force capable of rolling a minimum of a 2,000 pound load a desired distance between the opposite parallel tracks running between the front and back side or front and rear of the trailer.

Further, double action pneumatic linear actuators operating in a transverse direction are mounted on the floor of the trailer at selected locations such as adjacent or at each rear corner of the trailer and in the center of the transverse tracks. Typically, these actuators will be secured at one end thereof to the supporting crossbeams beneath the trailer floor. The opposite end is constructed with a mechanism to engage a platform or pallet carriage.

Further, in a representative embodiment, double acting pneumatic linear actuators are mounted in the center of each of the sets of longitudinally extending tracks. Two or more such linear actuators may be mounted between each of the sets of longitudinal extending tracks. These actuators engage and operate to move platforms or pallet carriages and containers along tracks from the front to the rear or from the rear to the front direction within the trailer. The actuators mounted and extending in the longitudinal or lengthwise direction of the trailer may be mounted on the floor of the trailer or on a kingpin plate at the forward end of the interior of the trailer. The double action actuators are typically secured to the crossbeams below or supporting the trailer floor typically irrespective of their location within the trailer. The actuators typically have a capacity to effect movement on the longitudinal sets of rails of a minimum of 24,000 pounds of containerized goods.

The actuators may be comprised of multiple, simultaneously operating, parallel actuators having the appropriate force and driving capacity. Additionally, actuators may be positioned between or along the sides of each set of longitudinal rails extending between the front and the back of the trailer to provide an appropriate linear force for movement of pallets or containers on pallets along the tracks.

An aspect of the invention is the capability of installation in preexisting trailers. Further, the actuators, upon installation, may be programmed by means of a positive logic control (PLC) apparatus or device. Thus, the movement of pallets or carriages by actuators along the tracks longitudinally and transversely may be electronically programmed enabling the pallets within the trailer, upon appropriate identification and sequencing, to be arranged and arrayed in a manner which will enable their movement within the trailer in the most efficient and desired fashion consistent with a logistical program associated with the delivery of the containers mounted on a pallet or carriage. A manual override system may be incorporated to facilitate any changes required in the field or delivery or loading site with respect to movement of palletized containers within the trailer.

Another feature of or aspect of the invention is the utilization of pallet supports, container pallets or carriages which include a perimeter or circumferential lip which will typically extend around the periphery of the carriage or pallet. This will prevent product or containers mounted and supported on a carriage or pallet in containers from slipping or moving in a manner which would be dangerous or inhibit the desired movement and placement of pallets or carriages utilizing the system of the invention. A peripheral wall or lip on the carriage or the pallet may provide a retention wall which extends along the entire circumference of a carriage to collect and prevent leakage from a container on the pallet or avoid undesired dispersion of material, either in liquid or powder form. A partially peripheral wall may function to maintain a container located on the top surface of a carriage.

The carriages or pallets or pallet supports may include elements or mechanisms to engage the underside thereof by a drive rod of an actuator. For example, a hook and pin arrangement may be utilized to fasten, join or connect an actuator drive rod to the underside of a carriage or pallet or pallet support.

Thus, each one of multiple pallet supports or carriages provide horizontal alignment and support for movable cargo containers. Further, each of the support carriages may have multiple wheel assemblies that are secured to the underside of each carriage for supporting containers which, usually on pallets, are stacked on a carriage, in a substantially upright position. The wheel assemblies are sized, shaped and positioned for movement along the tracks. The wheel assemblies are designed to utilize casters that roll within both the longitudinal tracks and the transverse tracks. An example of a wheel assembly or caster is a roller in the form of a ball bearing to engage a track and rotatably mounted in a caster housing affixed to the underside of a carriage.

Drive members or actuators are mounted on the trailer bed along the sets of longitudinal tracks and the transverse tracks. The support carriages are operatively interconnected to appropriate drive members such as linear cylinder and rod actuators. Further, a system such as previously described is provided for moving carriages between a raised, mobile position and a lowered immobile position relative to the tracks so that carriages, with the containers in the raised position, may be caused to be moved by the drive members (e.g. actuators) from a first position to a second desired position along any of the longitudinal tracks and transverse tracks.

Typically, a container identification code (such as a barcode) is provided for each of the containers supported on a carriage. The carriages with a container may be sequentially moved by appropriate actuation and operation of the carriage movement mechanisms, e.g., actuators by an operator utilizing appropriate actuator controls. Carriage movement is thereby controlled so that one or more of the containers are moved to a desired storage position or to an unloading position.

Thus, an aspect of the invention comprises various means and mechanisms for moving and arranging the carriages within the vehicle in a desired order or array. That is, the floor of the cargo space may be divided into multiple, typically equally sized sectors or bays. By way of example, a truck trailer floor may have a longitudinal length of 53 feet and a width of 98 to 102 inches. Typical pallet sizes range from 48×48 inches to about 20 inches×48 inches or less. Thus a support carriage which has a dimension of slightly greater than 48 inches×48 inches can accommodate most standard United States and foreign pallet sizes. Such a carriage may include a partially peripheral lip, a fully peripheral lip, alignment lips at the corners, or other alignment features to maintain a pallet with a container load on the carriage.

In this example the floor of a typical 53 feet long cargo space may be divided into multiple, equally sized bays to accommodate 48 inch×48 inch sized pallets results in two parallel sets of thirteen longitudinal bays extending side by side for the length of the truck floor or bed. Spacing between the parallel sets or rows and the side walls of a pallet in each bay is limited to about 4 to 6 inches and the truck bed will have typically about 12 inches of longitudinal space which is available to separate carriages with pallets thereon. In such a circumstance, movement of pallets on carriages longitudinally is generally easily accomplished. However, transverse movement of carriages with pallets thereon between bays may be difficult. This results because longitudinally adjacent carriages must be adequately separated to enable positioning and movement thereof on transverse tracks which are typically located at the front end or rear end of the truck floor or bed. Thus, the carriages which are typically in position longitudinally in abutting relation may be engaged and moved simultaneously along a set of longitudinal tracks. But to effect transverse movement between parallel tracks or bays, an open bay is required and longitudinally adjacent carriages must be separated adequately to permit transverse movement on the transverse tracks.

An aspect of the invention is a design which permits and accomplishes appropriate separation and alignment of a carriage for movement along transverse tracks. First, if all the bays of the trailer bed are filled, a carriage must be moved from a rear end bay. This can be done by transfer of a carriage onto a rear lift gate. The lift gate may be a full width lift gate or a lesser width lift gate designed to receive and retain a loaded carriage. The lift gate is thus appropriately raised and aligned to enable transport of a carriage from a longitudinal track set in the interior of the truck onto a storage track on the lift gate. An open bay is thus crated at one end of a longitudinal row of bays.

Next, assuming a transverse track is installed at the rear end of the trailer floor or bed, the carriage located generally transverse to the open bay is aligned with the transverse set of tracks by unlocking that carriage from longitudinal restraint and operating an actuator to appropriately space the unlocked carriage from the adjacent and full longitudinal row of carriages. The carriage is moved to align with the rear end transverse track. The transverse actuator is then operated to transfer the carriage laterally or transversely to the adjacent longitudinal row.

In this example the spacing of a carriage at the rear end of the truck bed aligns the carriage by moving the carriage rearwardly to become aligned with the transverse tracks at the rear end of the bed which are spaced rearwardly in a manner which permits transverse or lateral movement. Thus, when the carriage is transferred to the adjacent longitudinal tracks, it remains spaced from the carriage on that longitudinal set of tracks.

In a similar manner, such transfers can be effected with respect to a transverse track set at the front end of the trailer. Also, carriages may sequentially be transferred and cycled so that a desired carriage (with a pallet or container or without a pallet or container) may be positioned in an empty bay of an adjacent longitudinal row.

Use of the transfer system may be conducted even though the truck floor may be of lesser length than described. This results since the transverse transfer tracks will typically be more narrowly spaced than the longitudinal carriage dimension. For example, spacing two carriage caster rows by 24 inches and locating the casters 12 inches from the longitudinally rear edge of the carriage enables a transverse track design which may project the carriage slightly outwardly from the rear end of the truck bed. By providing mechanisms and controls which limit carriage movement, retain carriage positions to provide longitudinal carriage spacing, the carriages may be arrayed, arranged, loaded and off loaded in a desired sequence. Thus, embodiments of the invention are enabled to be incorporated in truck trailer vehicles over a broad range of possible dimensional designs.

The pallets in the parallel longitudinal tracks may thus be cycled back and forth with one of the pallets retained at either the front or rear of the trailer thereby positioning a desired pallet at the rear of the trailer by opening one additional space at the front or rear of the trailer for one or the other of the longitudinal tracks. By utilizing the actuators in an appropriate sequential manner to transfer pallets between the laterally aligned sets of tracks running between the front and the rear while storing at least one of the palletized items on the lift gate enables cycling the palletized items in a manner which will provide additional space for moving a pallet transversely between a first set of the longitudinal parallel tracks to a second set thereof.

In summary, various aspects of the invention include the feature of utilizing double acting linear actuators located at strategic positions on the floor of a trailer to engage and move carriages mounted on roller casters. The carriages are sized and positioned in parallel rows within the trailer with the casters mounted on tracks that may be elevated from a seated position in a track housing to a raised position which enables the carriage to move along sets of tracks. The mechanism for raising and lowering the carriage tracks may comprise pneumatic bladders or mechanical pistons or other means. The tracks typically comprise parallel sets extending between the front and rear of the trailer with one or more connecting sets of transverse tracks. A lift gate at the rear of the trailer may accommodate one or more carriages with a palletized container or containers thereon. Thus, the lift gate may include one or more sets of parallel tracks which comprise extensions of the internal tracks within the trailer. The lift gate may be capable of lowering for removal of a palletized carriage. The lift gate may be maintained at the level of the trailer to temporarily receive a palletized carriage to open a storage location within the trailer thereby enabling cycling of the remaining carriages in the trailer between the carriage locations to, for example, position a desired palletized carriage at the rear of the trailer for unloading. Programmed movement of the carriages may be effected by programming the sequence of operation of the actuators that move the carriages. The actuators may include programmed lock and release connectors to engage or release connection with a carriage. Thus, multiple actuators strategically positioned (typically on the floor of the trailer intermediate the tracks or lateral to the tracks) may provide the capability to move carriages to and from selection positions within the trailer.

Strategically positioning the transverse sets of trucks in combination with mechanisms and controls for locking carriages in a fixed position while spacing a select carriage from the longitudinal fixed position carriages enables alignment and transverse transfer between parallel sets of longitudinal tracks. The combination of track placement, stop mechanisms, and actuator mechanisms facilitates application of the described concepts to a broad spectrum of product transport vehicles.

These and other aspects, objects and features of the described apparatus are discussed and set forth herein in further detail.

BRIEF DESCRIPTION OF THE DRAWING

In the detailed description which follows, reference will be made to the drawings comprised of the following figures:

FIG. 1 is a pictorial view of a semi trailer truck carrier with the trailer carrying containers of products;

FIG. 3 is a partial sectional view taken along the line 3-3 of FIG. 2 showing a mechanism for moving the lift gate;

FIG. 4 is a top plan view of one embodiment of a carriage for receiving the palletized cargo containers of FIG. 1;

FIG. 5 is a side elevational view of the carriage embodiment of FIG. 4;

FIG. 6 is a bottom plan view of a carriage embodiment illustrated in FIGS. 4 and 5;

FIG. 7 is a top plan view showing movement of containers carried by carriages along the tracks by operation of a drive assembly;

FIG. 8 is a top plan view, similar to FIG. 7, showing movement of a container into an open space as shown in FIG. 7;

FIG. 9 shows a container on the split tail gate moved to a second position;

FIG. 10 shows the empty tail gate moved back to its original position and with all the containers moved into position in the cargo space with no open position;

FIG. 11 is a top plan, partially broken view, of sections of the drive members for moving the carriages;

FIG. 12 is a sectional view of the drive members taken along the line 12-12 of FIG. 11;

FIG. 13 is a sectional view of the drive members taken along the line 13-13 of FIG. 11;

FIG. 14 is an enlarged broken sectional view similar to the left side portion of FIG. 12 showing a portion of one carriage in a raised moveable position and in position to be moved by a drive member;

FIG. 15 is a view similar to FIG. 14 which shows a carriage in the lowered immobile position;

FIG. 16 is a detailed perspective view of a portion of the drive member; and

FIG. 17 is a pictorial view of cleats on the drive for engaging the underside of gear racks provided on the underside of each carriage.

FIGS. 21 A, B, C and D depict plan views of the positioning of actuators with respect to operation and movement of the palletized container carriage mounted on tracks of a trailer floor wherein FIG. 21B depicts the configuration of carriage bays within the trailer;

FIG. 22 is a side elevation illustrating a step in the procedure of movement of palletized container carriages between longitudinal sets of tracks and temporary storage of a palletized container carriage on a rear lift gate;

FIG. 23 is a schematic side elevation of a further step in the transfer of pallet supports between longitudinal sets of tracks;

FIG. 25 is a diagrammatic top plan view of a truck bed configuration incorporating the configuration and assembly of the invention illustrating the manner of movement of carriages for pallets in order to facilitate loading and unloading and transfer thereof;

FIG. 26 is a further diagrammatic view illustrating the protocol with respect to movement of carriages which support pallets and containers;

FIG. 28 is a diagrammatic view of an intersection of a transverse and a longitudinal track illustrating a construct to effect transfer at a carriage between sets of tracks;

FIG. 29 is a schematic plan view of track sets which employ features for carriage transfer depicted in FIG. 28;

FIG. 30 is a schematic plan view of track sets depicting further features for carriage transfer;

DETAILED DESCRIPTION

Figure 18:
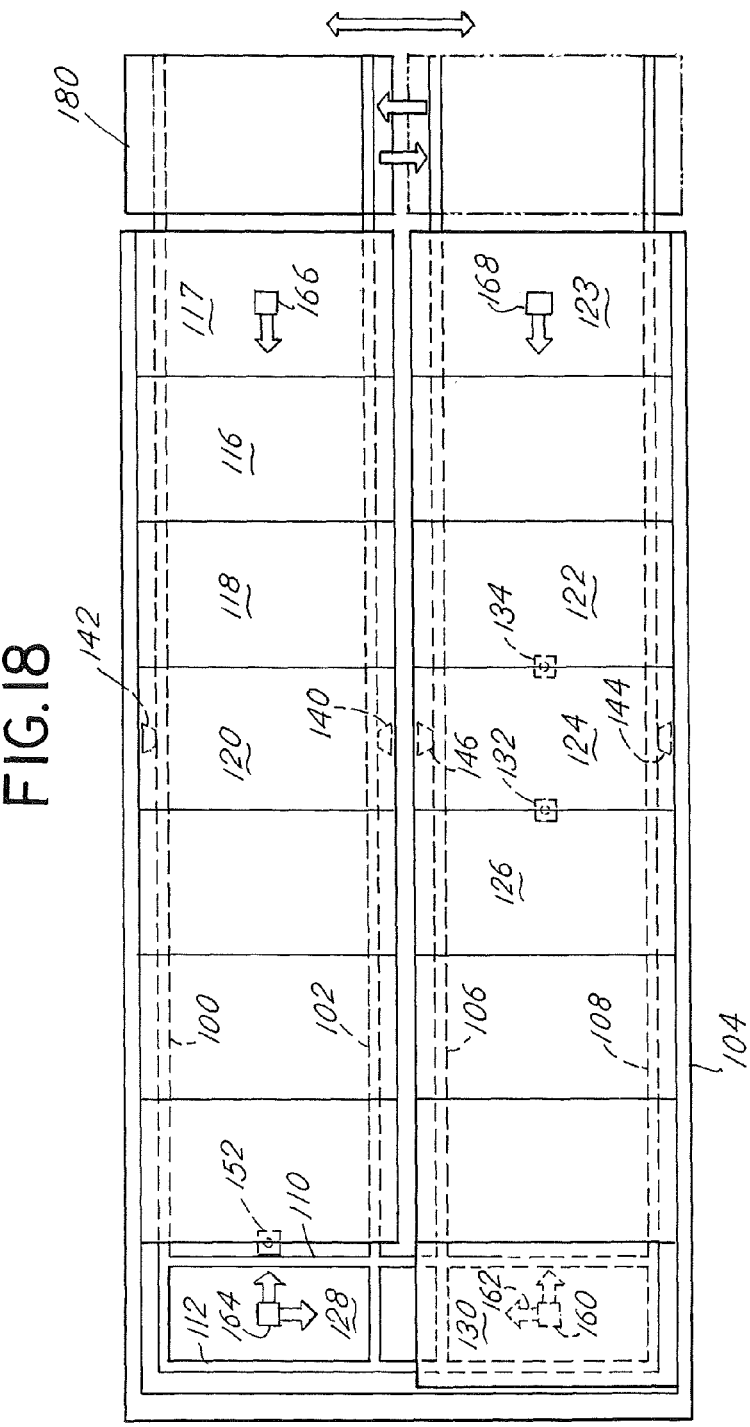
FIG. 18 is a plan schematic view of an alternative design of an embodiment of the invention incorporating linear actuators, an alternative track system comprised of bearing races and a lift gate having side-to-side movement capability and vehicle to vehicle pallet movement.

Referring to the attached drawings, particularly FIG. 1, the system and apparatus for facilitating loading and unloading of containers is shown. Specifically, FIG. 1 illustrates a semitrailer truck ST having a driver cab DC used for pulling or carrying a rear trailer 10 in a conventional manner. The trailer 10 is shown in partially broken view at the rear part of the trailer 10. Product containers PC are schematically shown loaded in the cargo space, generally 14, of the trailer 10. The product containers PC are shown in a stacked position within the cargo space 14. One stacked set of containers PC is shown mounted on a half lift gate 16. The arrows shown in FIG. 1 illustrate movement of the product containers PC in a manner to be described hereinafter in greater detail. The trailer 10 is shown with a rear door 18 in the open position.

For purposes of simplicity, the product containers PC are shown generally as large boxes. The product containers PC consist of conventional products used in the shipping industry that are normally carried on pallets (not shown) of a conventional type, usually made of wood or plastic. It is to be understood that the product containers PC, as shown, consist of multiple containers secured by labeled shrink wrapping on pallets (not shown), that support the containers PC in a conventional manner. It is to be understood that the present invention is not to be limited to improvements in the cargo space 14 of the type shown in FIG. 1, that is, in a trailer. The present invention may be used in connection with any type of cargo space particularly when used in connection with vehicles of any type wherein pallets supporting product containers PC must be moved in and out of a cargo space with pick ups at various locations and with drop offs at various locations.

Figure 2I:
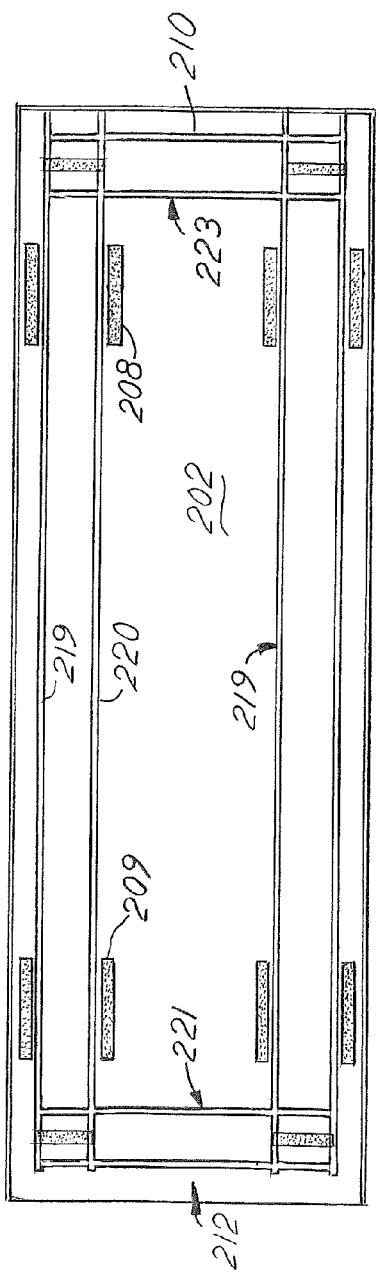
FIG. 2 is a broken pictorial view showing the floor of the cargo space of FIG. 1 with laterally spaced and opposed sets of elongated tracks and a set of tracks at the front of the trailer transverse to the two sets of tracks and showing a laterally movable split lift gate.
FIG. 2A is a broken view similar to the lift gate section of the embodiment of FIG. 2 showing an alternate form of a lift gate.
Figure 2I:
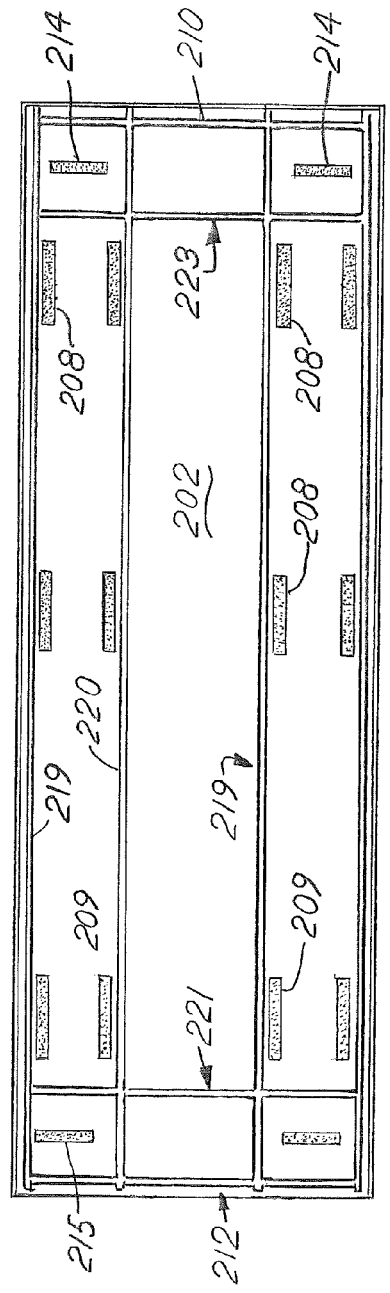

The present invention broadly consists of a track assembly, generally 20, shown best in FIGS. 2 and 2A, container carriages, generally 22, shown best in FIGS. 4-6 and a drive assembly, generally 24, shown best in FIGS. 11-17.

Track Assembly

Referring to FIGS. 1 and 2, the cargo space 14 of the trailer 10 has a floor, generally 26, a pair of laterally spaced upright side walls, generally 28, extending upwardly from the trailer floor 26, and a roof, generally 30. In addition, the cargo space 14 has a front wall 32. As indicated previously, a pair of hinged rear doors 18 (only one door being shown) are hingedly mounted to the upright rear of the side walls 28 for providing access to the interior of the cargo space 14. A half lift gate 16 is moveable about the rear of the floor 26 about a transverse, generally horizontal axis.

The track assembly 20 is securely mounted on the floor 26 of the cargo space 14. The track assembly 20 consists of multiple longitudinal and transverse tracks that are formed in the floor 26 of the trailer or in a retrofitted assembly mounted on the floor 26. For purposes of simplicity, the tracks are shown in the trailer floor 26. Specifically, the track assembly includes a pair of laterally spaced tracks, namely, left or driver side tracks 34 and passenger side or right side tracks 36. Both sets of tracks 34 and 36 extend from the front wall 32 back to the opening at the rear door 18. In addition, referring to FIG. 2, a front set of transverse tracks, generally 38, and a middle set of transverse tracks, generally 40, are shown in FIG. 2. Both the front set of tracks 38 and the middle set of tracks 40 intersect the elongated left side tracks 34 and the elongated right side tracks 36. Referring to FIGS. 12, 14 and 15, it is seen that the tracks 34, 36, 38 and 40 are all generally U-shaped in cross section and define an elongated cavity 42.

For reasons to be described hereinafter in greater detail, each of the tracks has an enclosed inflatable bladder resting in the bottom of the U-shaped cavity 42. The elongated bladders 44 have a closed interior that is interconnected to a source of air pressure such as commonly available either on the truck and/or in the dock area where the cargo spaces of trucks are commonly loaded and unloaded.

Referring to FIGS. 2, 2A and 3, the track assembly 20 further includes two alternate embodiments, one shown in FIG. 2 and the other shown in FIG. 2A. In the embodiment of FIG. 2, a half lift gate 16 is shown. A mechanism (not shown) is constructed and arranged to move the rear lift gate 16 laterally back and forth along the rear edge of the floor 26 of the trailer 10. The embodiment of FIG. 2 includes a pair of lift gate tracks 25 that are moveable into position for alignment with the right side tracks 36, as shown in FIG. 2, and for alignment with the left side tracks 34. Referring to FIG. 2A, a full lift gate, generally 48, is shown. The full lift gate 48 includes two sets of longitudinal tracks, namely, left side tracks 50 and right side tracks 52. The left side tracks 50 on the lift gate embodiment 48 is in direct alignment with both the rear end of the left side tracks 34 and the right side tracks 52 on the lift gate 48 and in direct alignment with the right side tracks 36. In addition, both the half lift gate 16 and the full lift gate 48 are moveable about a transverse substantially horizontal axis 54. A pressurized cylinder 56 is rotatably connected to the floor 26 of the trailer 10 by a bracket 58. The opposite, moveable end of the cylinder 56 has a rod 57 connected to a linkage 60 which is operatively connected to the underside of either the full lift gate 48 or the half lift gate 16. As will be described, the tilting of the lift gate 16 or 48 as shown in FIG. 3 assists in loading the containers PC into the cargo space 14, when in the upwardly angled position, and assists unloading the containers PC when in the marginally downward angled position to assist in the movement of the product containers PC out of the cargo space 14 of the trailer 10 since the tracks 50 and 52 are also marginally downwardly angled.

Container Carriages

Multiple carriers, generally 22, are provided for carrying the product containers PC. Each carriage 22 consists of an upper carriage floor 62 and a lower carriage floor 64. The upper floor 62 preferably has no openings, particularly when food products are being stored and moved on the carriages 22 so as to avoid moisture dripping on the tracks. As discussed previously, the product containers PC consist of conventional products carried on pallets (not shown). Since the carriages 22 receive the pallets, the rectangular carriage floors 62 and 64 are slightly larger than the exterior dimensions of a conventional pallet. Each carriage has a pair of spaced front and rear walls 66 and 68, respectively, and a pair of laterally spaced side walls 70 interconnected to the front walls 66 and 68. The walls 66, 68 and 70 of the upper carriage floor 62 are raised so as to secure the pallets within the package containers PC. The carriage floor 62 can be readily cleaned as by washing with a hose or the like.

The lower carriage floor 64 provides support for a downwardly facing gear rack 72 that extends below of the carriage 22. The gear rack 72 is spaced centrally of the side walls 70 of a carriage 22 and extends in front and rear directions near the front wall 66 and rear wall 68. The gear rack 72 includes teeth as seen best in FIGS. 5, 14 and 15 with the teeth facing downwardly to engage components of the drive assembly 24 to be hereinafter described in greater detail. A pair of transverse gear racks 76 are positioned between each of the side walls 70 of the carriage 22 and transverse to the central gear rack 72. The transverse gear rack 76 includes teeth similar to the teeth 74 of the gear rack 72. The gear racks 72 and 76 are constructed and arranged to be operatively engaged by the drive assembly 24 to provide transverse and longitudinal movement of the carriages 22.

The lower carriage floor 64 provides support for four universal wheel assemblies 78 of a conventional design that are received in the tracks 34, 36, 38, 40 and 25 of the track assembly 20. The wheels 78 are universally moveable in the track assemblies 34, 36, 38, 40 and 50 in forward, rearward and lateral directions. A support plate 80 for the wheels 78, as seen best in FIG. 5, is mounted on the underside of the upper carriage floor and passes through an opening provided in the lower carriage floor 64 of the carriage assembly 22. An upright shaft 82 secures the wheels 78 to the upper floor 62 of the carriage 22. As indicated previously, the carriages 22 are freely moveable within and along the tracks 34, 36, 38, 40, and 52. The carriages 22 are moved into the track areas from the rear of the floor of the cargo space 14 since members (not shown) prevent movement of the wheels 78 from upward movement. The number of carriages 22 used in combination with the track assembly 20 may vary depending on the number of loaded containers PC which are being moved along the track assembly. Generally speaking, the number of carriages 22 may equal the number of positions in the cargo space 14. If a carriage 22 is not being used, it may be stored within the cargo space, if desired, or it may be left anywhere in the cargo space without any product containers thereon.

Drive Assembly

The drive assembly 24 is constructed and arranged to move the carriages 22 along the track assembly 20 and also moves the containers PC on the carriages to a desired location, such as to a position for unloading or loading. The carriages 22 carry the product containers PC thereon, whether in single stack or a double stack, as shown in FIG. 1. Referring to FIGS. 1, 2A and 3, the drive assembly 24 consists of a left side/passenger side drive chain 86, a right side/passenger side drive chain 88, a lateral or transverse front drive chain 90 in close proximity to the front wall 32 of the cargo space 14 and a lateral or transverse intermediate drive chain 91, at the intermediate portion of the elongated tracks 34 and 36, as seen in FIG. 2.

Referring to FIGS. 2 and 11-17, the left side drive chain assembly 86 and the right side drive chain assembly 88 extend from proximity to the front wall 32 of the cargo space 14 back to the rear of the floor 26 near the opening at the rear door 18. Each of the chain drives 86 and 88 are positioned centrally of and between the tracks of the left side 34 tracks and the right side tracks 36 and are positioned directly under the gear racks 72 carried on the underside of the carriages 22. Slots 128 are provided in the floor 26 so as to allow the drive chain to engage the racks 72 and 76 of the carriages 22. Multiple supports 92 are provided for multiple sprockets 94 for the chain drives 86 and 88. The sprocket supports 92 are mounted on the underside of the floor 26 of the trailer ST in enclosed chambers (not shown). A drive motor 96 is mounted on the underside of the floor 26 and is used to drive the left side chain drive 86. A drive motor 98 is mounted on the underside of the floor 26 and is used to drive the right side drive chain 88. A drive sprocket 100 is driven by the drive motor 96 for forward and reverse movements of the left side chain drive 86 and the right side motor 98 drives the right side drive sprocket 102 for driving the right side chain 88 in forward and reverse directions.

Referring to FIGS. 11 and 12, a drive motor assembly 104 is provided for movement of the carriages 22 along the front set of tracks 38. A separate drive (not shown) for the middle transverse tracks 40 operates in precisely the same manner as the movement of the carriages in the front side tracks 38 by a drive assembly (not shown).

Referring to FIGS. 11 and 12, a drive chain 106 is positioned centrally in a slot 108, in the floor 26 for the front side drive assembly 104. Multiple driven sprockets 110 and multiple chains 112 are provided. The sprockets 110 are supported by the floor 26 and the chains 106 are operatively interconnected to the sprockets 110. The sprockets 110 and the chains 112 are designed to pass under the longitudinal tracks 34 and 36 of the track assembly 20. The drive motor 104 is supported by the floor 26 and operates to drive the chain 112. The chain 112 is positioned centrally of the front tracks 38 and when a carriage 22 is in position, the chain 112 engages a transverse gear rack 76 carried on the underside of each of the carriages 22. A drive motor 104 is operated to move in left and right directions in order to move each carriage 22 between the left side tracks 34 and the right side tracks 36.

Referring to FIGS. 14 and 15, a drive chain 120 is positioned underneath the gear rack 72 and the teeth or cleats on the chain drive 120 engage the teeth 74 on the rack 76 on the underside of a carriage 22. A bladder 124 under the chain 120 is in communication with air pressure for expanding the bladder 124 to raise the chain 112 into the engaged position with a rack 72. Referring to FIG. 15, when the carriage is at rest, both the bladders 74 and 124 are deflated and the carriages 22 are lowered to a rested, immobile position.

It is to be understood that rig weight is a critical factor in the trucking industry. Overall weight of the truck is limited by law. The level of additional weight created by the apparatus 10 discussed above will come under intense scrutiny by the trucking industry as well as by government authorities. As a result, it would be appropriate that the main components of the apparatus 10, that is, the track assembly, generally 20, the container carriages, generally 22, and the drive assembly, generally 24 will at least have some components composed of a high density carbon fiber designed to minimize additional weight. The track channels, for example, may be lined with a light steel to reduce friction with the carriage wheels 78.

Operation of the Apparatus

As described above, the key elements of the apparatus 10 for facilitating loading and unloading of containers PC in and out of a cargo space 14 includes a preexisting cargo space having a floor 26, a front wall 32, and upright lateral side walls 28. The track assembly 20 can either be a permanent installation with the floor 26 of a cargo space 14 or, alternatively, the track assembly may be separately installed as a retrofit assembly.

As described above, the longitudinal left side tracks 34, right side tracks 36, transverse front tracks 38 and transverse middle tracks 40 are non-moveable parts of the overall system. Even though the various tracks are immobile, the bladders 44 extend longitudinally for the entire length of the tracks 34 and 36. Similarly, the bladders 44 extend for the entire length of the tracks 38 and 40. All of the bladders 44 communicate with an air pressure source (not shown). The bladders 44 in the tracks 34, 36, 38 and 40 vertically expand under pressure and cause the carriages 22 to be raised from the lowered position of FIG. 15 to the raised position of FIG. 14. A rigid elongated strip 126, preferably of metal, rests on top of the bladders 44 and are interposed between the bladders 44 and the wheel assemblies 78. The strips 126 facilitate movement of the wheels 78 along all of the tracks of the track assembly 28.

The carriages 22 for the product containers PC are moveable in both forward and rearward directions along the elongated tracks 34 and 36 and along the transverse tracks 38 and 40. The wheel assemblies 78 of the carriages 22 ride along all of the tracks and are supported by the elongated strips 126 while moving in the tracks 34, 36, 38 and 40. The carriages 22 are driven by the drive assembly 24. Specifically, the movement along the left side tracks 34 and right side tracks 36, the left side chain drive 100 and the right side chain drive 102 is accomplished by the cleats or teeth 120 carried by the chain drives engaging the gear racks 72 or 76. For transverse movement of the carriages 22, the cleats or teeth 120 of the chain drive 106 cause transverse movement of the carriages 22 from one side of the cargo space to the other by the chain drive 106 engaging the transverse racks 76 of the carriages 22.

Referring to FIGS. 14 and 15, the bladders 124, which are connected to an air pressure source, are activated to raise the drive chains to maintain driving interconnection between the gear rack 72 or transverse gear rack 76 of the carriages 22 by the cleats or teeth 120 engaging in the teeth of the gear racks 72 and 76. FIG. 14 shows the carriage 22 in a raised mobile position. Referring to FIG. 15, the bladder 124 is deflated as is the bladder 44 carried within the tracks 34, 36, 39 and 40 when the carriages are in an immobile position. Engagement is always maintained between the cleats or teeth 120 carried by the chain drives of the drive assembly 24 and the teeth of the gear racks 72 and 76 of the carriages 22.

Practical Operation

As further explanation of the invention, an example of the manner of using the improved system for loading and unloading semi trailers cargo space with pallets of product containers PC will be described.

In the trucking industry, every pallet having product containers PC thereon is labeled separately by its trailer position as shown on the driver's manifest. Labels are provided indicating the products involved, for example, green for fresh food, red for frozen food, and perhaps yellow for dry food. The labels also indicate "top load only" for some containers, such as a confectionery product, that could be damaged if loaded under a heavy container PC. The labels can be used for identifying stored positions for a handheld computer. Generally, almost all pallets with multiple layers of containers PC will be shrink wrapped with the identifying label on the inside or outside of the shrink wrap.

First, when loading the trailer with carriages 22, the shipping handlers will load the containers PC on the carriages 22 which are positioned with wheels in the tracks 34, 36, 38 and 40. An operator, normally the driver of the semitrailer truck, will use the handheld computer or even a smart phone to identify the stored position of a given carriage 22 having one or two levels of product containers PC thereon. The carriages 22 are loaded at the rear of the floor of the cargo space. When the carriage 22 with its product container PC load reaches its resting position, the operator identifies the location. The same thing happens with each product container PC until the cargo space 14 is partially or completely filled. The operator then has a complete memory of the container locations stored on a handheld computer (not shown) for purposes of unloading. The loading of the truck cargo space may occur on both the left side tracks and the right side tracks. If a split lift gate 46 is being used, the lift gate will be moved laterally between the left side tracks 34 and the right side tracks 36. The carriages 22 with containers PC may be moved transversely along the front transverse tracks 38 or the middle transverse tracks 40.

After the loading has been completed, and delivery is to be made at a delivery location, the operator proceeds with unloading at least one pallet of product containers PC. As in the core of loading, the carriages 22 are unloaded at the rear of the cargo space by a fork lift. The lift gates are used only for movement of product. As discussed above, during the movement of the carriages 22 on the tracks 34, 36, 38 and 40, the bladders 44 and 124 have been raised to a mobile position by a pressure source to allow the carriages 22 to move along the tracks both transversely and longitudinally. A power source, usually the truck itself, is provided to operate the drive assembly. The drive motors 104 are electrically operated by a power source. Drive motors are interconnected to switches (not shown) which are manually operated. For the longitudinal movement of the carriages 22, switches (not shown) are provided with three positions, that is, off, forward and reverse. Similarly, a three-position switch will be provided for each of the drive motors for the movement of the carriages 22 along the transverse tracks 38 and 40. Similarly, simultaneously with moving the carriages the bladders 44 and 124 are raised so as to lift the carriages 22 to the raised mobile position of FIG. 14. The pressure source (not shown) is operated by an on/off switch. The operator operates a series of switches provided at a location, usually on a side wall 28 near the rear door 18 opening of the cargo space 14.

Referring to FIGS. 7-10 it is shown how the containers PC may be moved in a circuitous direction. FIG. 7 shows an open space being provided in the right side. All the right side carriages 22 are moved rearwardly with one container PC being loaded on the split lift gate 46. This creates an open space. Referring to FIG. 8, the open space allows the system to move a carriage 22 to the open space at the front right hand corner of the cargo space. Referring now to FIG. 9, the split lift gate is moved transversely into position to align the tracks shown on the split rear gate into position in alignment with the left side tracks 34 while carrying the product container PC. In FIG. 10 it is shown that the open space at the left front corner has been filled by a container PC and the split lift gate has been moved back to its normal position.

As indicated above, the practical operation has been discussed above by using manual operations, manual switches, and a memory stored on a handheld computer by the operator or driver. It is to be understood, however, that the present invention may have an operating system that is completely computerized by using scanners, memories, drive connections and the like.

Also, as indicated earlier, the invention as described may also be adopted for box trucks and vans engaged in the package and grocery delivery industries. This adoption of the invention can be achieved by using a smaller multi-tiered track system, a smaller adjustable height lift gate, and by replacing the pallet carriages with a reduced size carriage box to accommodate packages and groceries.

Alternative Embodiment Features

Figure 19:
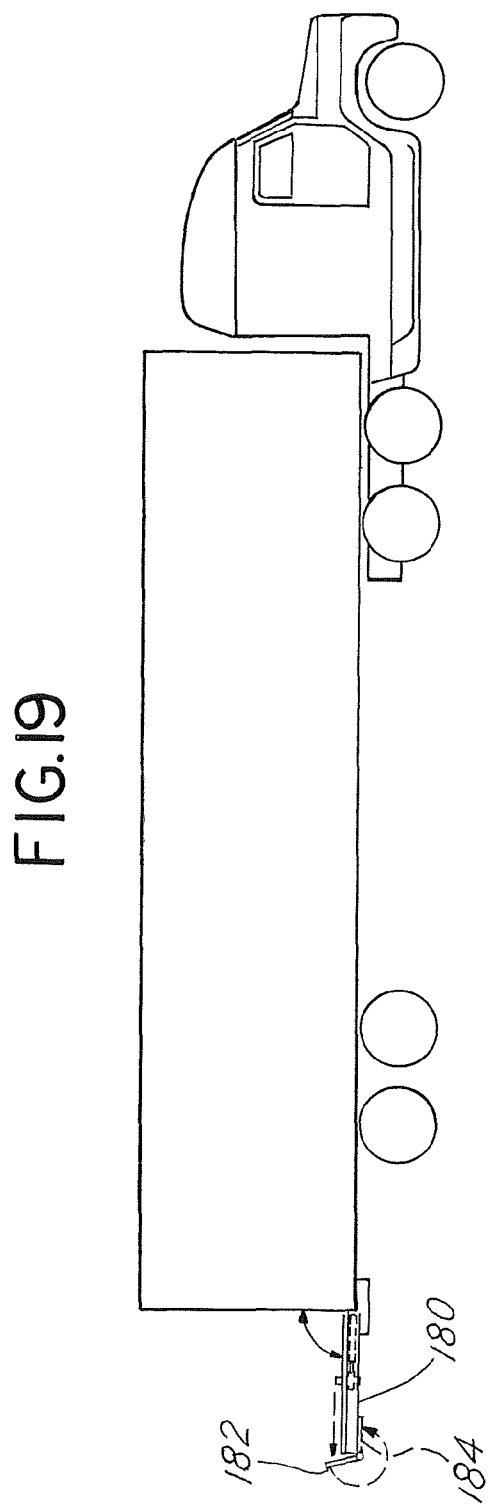
FIG. 19 is a diagrammatic side elevation of an alternative or further embodiment depicting the alternative lift gate construction enabling transfer of pallets or packages between transport vehicles.

FIGS. 18 and 19 illustrate various alternative features for embodiments of the invention. Referring first to FIG. 18, there is depicted an alternative track arrangement for support of pallets. Specifically, a track array includes a first longitudinal track 100, a generally parallel, second longitudinal track 102 which together comprise a pair of guide 100, 102 and support tracks for a pallet upon which product may be supported. The tracks 100 and 102 are each comprised of bearings, such as roller or ball bearings, forming a longitudinal race the length of the truck trailer or enclosure 104. A second set of similar longitudinal tracks 106 and 108 are also comprised of bearings, or race bearings, and are positioned in a lateral parallel section of the trailer enclosure 104.

Transverse race bearing tracks 110 and 112 are arrayed at the enclosed end of the trailer enclosure 104 and comprise parallel tracks for pallet support and for transfer of pallets having packaging thereon between the longitudinal pallet storage and support sections of the trailer 104. The trailer enclosure 104 with this array of tracks comprises a series of modular pallet sections, such as sections 116, 118, 120 and the like formed along one side of the trailer enclosure 104 and a second set of pallet sized, modular storage support section or areas 122, 124 and 126. In practice, all of the modular sized sections 116, 118, 120, 122, 124 and 126 are substantially identical in plan view and are identical to the end support sections 128 and 130 at the interior end of the trailer vehicle 104. In this manner, as previously discussed, pallets associated with the various modular sections may be moved in accord with the principles of the invention and likewise accessed in accord therewith.

With the disclosed array, the use of race bearings provides an easy alternative for moving a pallet supported on those bearings. Maintenance of the pallets in a particular location can be effected and retained by solenoid actuated locks, for example, locks 132 and 134 which may be electronically activated wirelessly. The locks 132 and 134 are positioned intermediate each of the pallet sections 124 and 126 by way of example. Of course, locks are typically provided with respect to all of the boundaries between the pallet sections such as 124 and 126 so that the pallets may be wirelessly locked into position within the trailer 104.

Pallets which are moved longitudinally along the various pathways defined by the tracks 100, 102, 106, 108, 110 and 112 are guided by guide blocks such as guide blocks 140 and 142 or guide locks 144 and 146. The guide blocks are strategically positioned along the pathway defined by the various tracks 100, 102, 106, 108, 112. Note that guide blocks are not necessarily positioned along the transverse track 110. However, a solenoid actuated guide block 150 may serve the dual function of a guide and a locking element in that circumstance.

Movement of pallets is effected by means of swivel mounted actuators which include a telescoping drive rod mechanism. For example, a swivel mounted actuator 160 is positioned in the middle of pallet location 130. The swivel mounted actuator may include a telescoping rod 162 oriented to push a pallet in either a lateral direction or a longitudinal direction as indicated by the arrows in FIG. 18. The actuator 160 thus includes a telescoping projecting rod or extension 162 which, when actuated, telescopes to initially engage the lower side or bottom of a pallet positioned on the tracks 110 and 112 and then to extend it laterally or longitudinally. A similar actuator 164 is positioned in the pallet bay 128. Longitudinal actuators 162 may be positioned in any of the remaining bays. By way of example an actuator 166 may be positioned in a bay 117. Similarly an actuator 168 may be positioned in a bay 123. Further actuators may be positioned in any of the bays to facilitate movement of pallets. All of the actuators and solenoids may be wirelessly operated to effect and control their operation. Of course, the entire series of elements may be hardwired. With this embodiment, however, the construction is greatly simplified by use of the actuators, solenoids and guides as described.

The operation of the actuators, the number of actuators and their positioning may be arranged to provide the most efficient way in which to transfer pallets longitudinally and transversely. That is, FIG. 18 depicts actuators which move pallets longitudinally in only the end bays at the opposite ends of the trailer enclosure 104. The closed end of the trailer 104 includes the pivotal swivel actuators inasmuch as that is the position of the transverse guiderails. However, any arrangement of transverse rails, and longitudinal rails and numbers of actuators may be employed depending upon the desires of the manufacturer or the particular service requirements for the transport trailer. Note that the system is especially useful with pallets having a uniform and standardized size and construction compatible with the actuators, etc. On the other hand, the system lends itself to service with variously sized and manufactured types of pallets. In other words, the design of the actuators and the solenoids and guides facilitates the universality of the system.

Referring now to FIG. 19, and FIG. 19 taken in combination with FIG. 18, there is illustrated an additional feature of an embodiment of the invention and its benefits. Specifically, in FIG. 19, there is depicted a lift gate 180 which has a construction similar to that previously described. That is, the lift gate 180 is comprised of a single section equivalent in width to the width of one of the longitudinal channels associated with the vehicle trailer enclosure 104. The lift gate 180 thus may be shifted from side to side in a transverse direction of the arrows in order to receive pallets thereon.

The lift gate 180 further includes a lip or bracket 182 at its outer edge as well as an array of longitudinal tracks extending from the outer edge. The bracket 182 may be pivoted between an upward position as illustrated in FIG. 19 and a lowered or phantom position 184 as illustrated in FIG. 19 and other figures. A pallet may thus be placed upon the lift gate 180. The lift gate 180 may then aligned with an adjacent vehicle with the lift gate bracket or bar or lip 182 in the lowered position 184 so that a pallet may be easily shifted from the tracks of one vehicle to another. The tilt of the lift gate 180 is thus controlled to enable the lift gate 180 to be appropriately positioned in opposition to a second vehicle. This arrangement provides significant advantages and a significant cost savings to trucking operations. Specifically, the trailer interchange mechanism can be utilized to create additional freight revenue which will be especially beneficial for smaller companies and owner operators which make up the vast majority of the trucking industry currently.

That is, many large carriers hire owner operators and small trucking companies to haul their freight. These owner operators are under contract to deliver product within a specified period of time, but the contracts do not prohibit the owner operators from taking on product from other sources, especially for return trips. As a consequence, there are very large freight forwarding companies that have nationwide networks that are in constant communication with shippers and carriers seeking product for delivery and delivery services throughout the nation. Having a large fleet of owner operators with the trailer interchange mechanism of the present invention and the various embodiments thereof including the pallet transfer system associated with the forwarding companies would be very beneficial.

An example illustrates the economic benefits associated with such an arrangement. That is, the owner operators are typically paid on a mileage basis for an outbound trip or on a percentage of revenue created by that trip. The path of a particular owner operator under contract intersects continuously the paths of other owner operators and parties needing to have goods shipped. Satellite communications link those drivers to a central communications control. The drivers in that circumstance can submit their itinerary and expected arrival and space availability terms after each delivery. In this way, their location and the space available on their truck are made available at all times regardless of truck location. As a consequence, those drivers may be efficiently directed to parties and shippers which require their services. As a further consequence, the carriage of product by trucks is made more efficiently utilized. Shippers will be able to have access to shipments in a faster, more efficient manner leading to significant cost savings as well as economic benefits to the owner operators.

Figure 20:
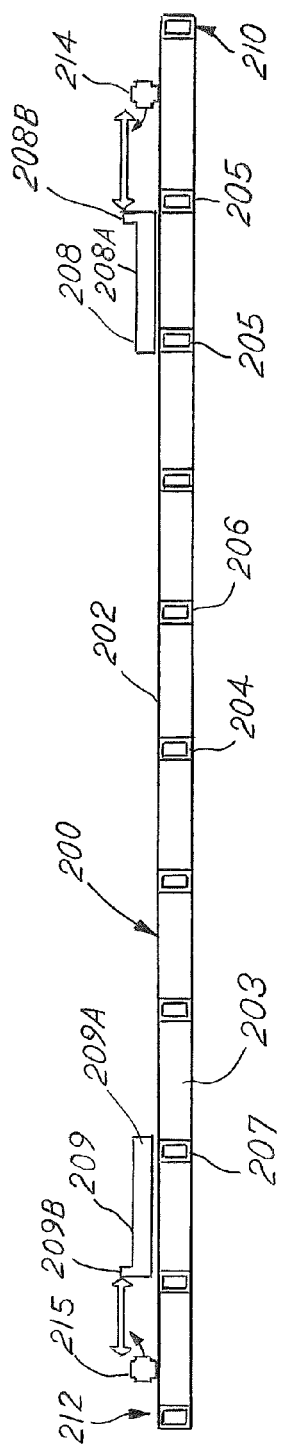
FIG. 20 is a side elevation of a flatbed of a trailer illustrating in a cross sectional view the transverse crossbeams of the trailer and the positioning of various actuators on the floor of the trailer intermediate the rows of parallel tracks to effect longitudinal as well as transverse movement of carriages or pallet supports mounted on tracks of the trailer floor.

FIGS. 20, 21A-21D, 22, 23 and 24 illustrate further aspects and objects of embodiments of the invention. Referring to FIG. 20, there is depicted a cross sectional view of the platform or floor 200 of a trailer. The trailer platform 200 includes a bed 202, typically a sheet steel material, supported by crossbars, such as crossbars 204 and 206, which are spaced one from the other and which extend transversely with respect to the length of the trailer bed 202 and a longitudinal side bar 203 on opposite sides of bed 200. The crossbars 204, 206 and side bars 203 provide support and structural integrity for the trailer bed 202 and, in addition, provide a grid for mounting an array of actuators such as an actuator 208 positioned at the front end 210 of the trailer floor 202 and an actuator 209 positioned at the rear end 212 of the platform or trailer bed 202.

The actuators 208, 209 include a cylinder 208A, 209A pivotally attached at one end to the trailer floor or bed 202 and crossbars (e.g. 205, 207) and with projecting, extensible and retractable rods 208B, 209B which are attachable to a carriage 260 or pallet carriage 260 to move that carriage 260 along tracks 219, 220 on bed 202 either longitudinally as, for example depicted in FIG. 21A. That is, actuators 208 and 209 provide for longitudinal movement of carriages to which they are attached. Transverse actuators such as actuators 214 and 215 provide for transverse or lateral movement of carriages 260 between parallel sets of longitudinal tracks 219, 220 by way of transverse tracks 221, 223 positioned on the floor or bed 202.

FIGS. 21A, 21B, 21C and 21D depict variations with respect to the deployment of actuators in combination with longitudinal track sets 219, 220 and transverse track 221, 223 sets. For example, FIG. 21A depicts a top view of a trailer floor 202 wherein longitudinal actuators 208 and 209 are arrayed between or intermediate the tracks of sets 219, 220, for purposes of longitudinal movement of carriages 260 on tracks or rails extending longitudinally between the opposite ends 210 and 212 of the trailer floor 202. The stroke or distance of transport effected by the actuators such as 208 and 209 may be varied. The actuators 208, 209 may thus incorporate telescoping rods which are capable of providing for variable distance or stroke of movement of carriages 260 on sets of tracks 219, 220 as they are driven longitudinally. Transverse actuators such as actuators 214 and 215 fastened to the floor 202 are capable of providing transverse movement of carriages 260 on transverse sets of tracks 221, 223 between the parallel sets of tracks 219, 220. The described actuators are double acting and designed to engage and couple to the underside of a carriage 260 by means of the actuator rod to cause controlled movement of the carriage 260 and items supported on the carriage.

As depicted in FIG. 21B, multiple or varied sizes of actuators 208, 209 may be strategically located longitudinally along a lateral side of longitudinal tracks 219, 220. As shown in FIG. 21C actuators 208, 209 may be positioned along each side of tracks 219, 220 to effect movement of the individual carriages along a set of longitudinal tracks 219, 220. FIG. 21D shows yet another variation of the position of actuators 208, 209 relative to transverse and longitudinal tracks 219, 220. Typically, actuators may be strategically located on the floor or bed 202 of the trailer with one end supported by or linked to a cross beam with a drive rod positioned to engage the underside of a carriage to move a carriage transversely on tracks 221, 223 between or from one set of longitudinal tracks 219 to another set 220 or along a longitudinal set of tracks 219 or 220.

Figure 24:
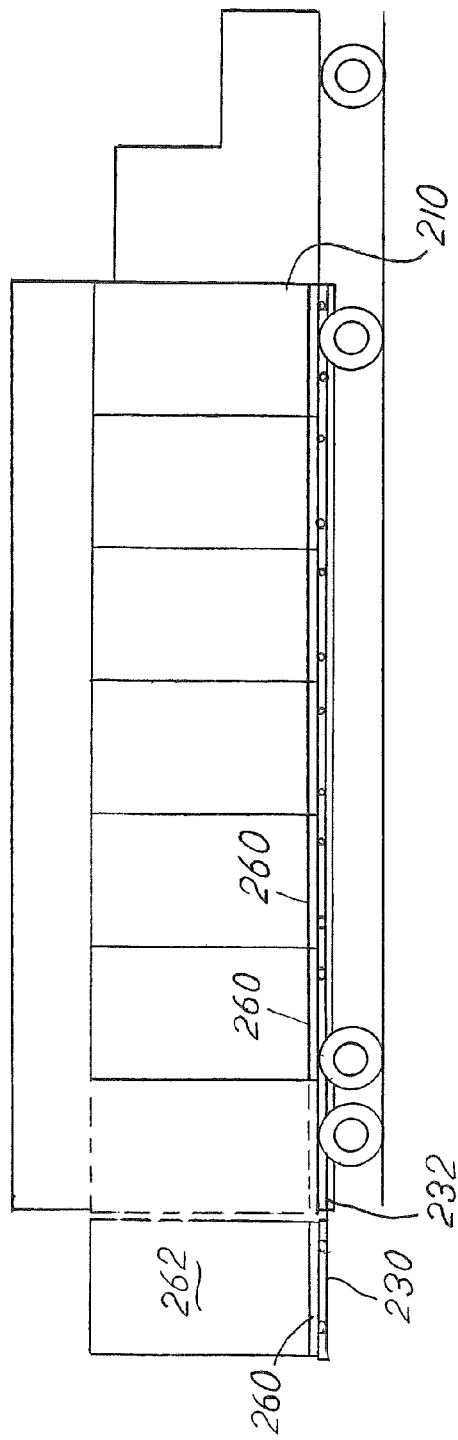
FIG. 24 is a further schematic of the transfer or movement of the palletized container supports mounted on pallets and moveable between various positions within the trailer between the parallel sets of tracks mounted on the trailer floor.

FIGS. 22-27 illustrate a feature directed to the movement of carriages 260 along longitudinal tracks 219, 220 between the front 210 and rear 212 of a trailer and on transverse tracks 221, 223. That is, carriages 260 that fit on and move along tracks are typically a modular size and carry a pallet 261 with a package 262. Often this size pallet 261 will have a plan view profile in the range of 48×48 inches. Thus, the distance between a front side 210 of a trailer bed 202 and the back side 212 of a trailer bed 202 will typically accommodate a specific number of carriages 260 with pallets 261, packages or crates 262 supported thereon. In the example of FIGS. 22-24, eight carriages 260 and the pallets 261 which fit thereon, may be loaded in a trailer having a longitudinal floor dimension of at least 384 inches. Some trailers will have a floor length which exceeds that dimension by a distance less than the modular carriage 260 size thereby enabling the provision of a small space, such as space 224 depicted in FIG. 23 between at least two adjacent carriages 260. Providing an adequate space 224 between at least two carriages 260 is an important objective in order to enable the programmable movement of carriages 260 and pallets 261 between longitudinal sets of tracks 219, 220 in a manner which will avoid interference of the carriages 260 and pallets 261 thereon, particularly during transverse movement from one set of longitudinal rails or tracks 219, 220 to another.

That is, the wall to wall width of a trailer typically exceeds, by way of example, an eight foot dimension thereby clearly enabling movement of side-by-side carriages 260 dimensioned 48 inches×48 inches on parallel sets of longitudinal tracks, thus enabling the carriages 260 and pallets 261 thereon to be separate and avoid interference insofar as the parallel, longitudinal rows are concerned and thereby enabling free longitudinal movement in the manner previously described. The carriages 260 may thus freely move along parallel, longitudinal rows to exit at the rear end 212 from the interior of the trailer.

However, if the confines of the trailer are longitudinally limited, there may be inadequate room to provide a space, such as interior trailer space 224, between carriages 260 that are to be moved transversely from an occupied position or bay to an unoccupied position or bay within the trailer compartment. The materials on the pallets 261 supported by the carriages 260 may interfere with one another during desired transverse movement since loaded carriages 260 located in bays adjacent the transfer tracks 219, 220 may interfere. For example, due to the fact that carriages may be locked in contact or abutting to maintain stability in the trailer during transport. Thus, providing adequate space 224 to permit smooth transfer of carriages 260 transversely or laterally becomes an important aspect or objective.

Such an objective can be accomplished in various ways. That is, if the interior longitudinal length of the trailer is adequate, then actuators can be located and operated to provide a space between selected carriages 260 in the longitudinal direction. Space 224 may, as previously mentioned, be provided inside the trailer. Nonetheless, the interior track arrangement should accommodate transverse or lateral carriage movement.

In that regard, FIG. 21B illustrates a necessary arrangement of tracks and bays to effect transverse movement of carriages 260 between longitudinal sets of tracks 219, 220 regardless of the longitudinal extent or dimension of the trailer bed.

Referring to FIG. 21B, the trailer bed 202 is divided into two longitudinal parallel rows of eight equally sized bays, A through H and A' through H' associated, respectively, with track set 219 and set 220. The bays A-H, A'-H' are sized to accommodate generally equally sized carriages 260 on longitudinal sets of tracks 219, 220. When the trailer bays A-H, A'-H' are fully occupied, the carriages may be "locked" in position by various means including by setting the actuators 208, 209 in a set condition. Thus, the cargo contents are stabilized.

In order to transfer a carriage 260 from one set 219 of the parallel track to another set 220, a space 224 is necessary separating two adjacent carriages 260. Also necessary is a set of transfer tracks 221 that have a proper gauge and location to permit movement transversely between the longitudinal sets of tracks 219, 220. This is provided by locating at least one set of transfer tracks, e.g., 221 located to provide a space 224. Thus, a phantom bay, J, as depicted in FIG. 21B, is provided. The phantom bay, J, is, in the example depicted, effectively rearward of the bay H thereby providing the space 224. Thus, a carriage 260 on one set 219 of longitudinal tracks 219 may move on transverse tracks 221 to the parallel set of transverse tracks 220, assuming adjacent bay J' is open.

To provide an open bay (J'), a carriage 260 may be moved from the bay H' to a lift gate in FIG. 22. Providing and positioning a carriage 260 and pallet 261 on a lift gate 230 thus may create an open bay J' of adequate size.

To provide additional space between carriages 260 so that carriages 260 may be transferred laterally or transversely without interference, the carriage 260 may overhang the extreme end 212 of the trailer by an acceptable distance. Thus, the longitudinal tracks 219, 220, carriages 260 and the actuators 208, 209 may be constructed to provide a limited overhang 232 which enables creation of an adequate space 224 internally within the trailer between carriages 260 to enable transverse movement of a carriage 260 between parallel, longitudinal bays J, J' and tracks 219, 220 as shown in FIG. 21B.

Assuming that a bay or open space J' on the adjacent parallel set of tracks 219, 220 is available, a carriage 260 at the forward end 210 on the parallel set of longitudinal tracks 220 of the trailer may be transversely moved from bay A' along transverse tracks 223 to an open bay A on the opposite parallel set of longitudinal tracks 219, 220. To provide such an open bay A, the carriages in bays A-G must be moved toward the rear on their tracks 219. Such movement is effected to create an adequate space 224 at the front end to make the appropriate transfer. This operation will provide a vacant bay A' where the prior carriage 260 was located. The actuators within the truck may then be operated to move the remaining carriages 260 from bays B'-J' toward the front 210 of the trailer floor 202. This then opens bay J' at the rear 212 of the trailer compartment. A carriage 260 moved opposite the newly opened bay J' at the rear 210 of the trailer compartment on track 219 is now available for transverse or lateral movement of the carriage 260 into the now opened bay J' along transverse tracks 221 at the rear end 212 of the trailer. The actuators or other mechanisms for moving the carriages 260 longitudinally and laterally may be programmably controlled to cycle carriage 260 movement for placement of any specific carriage 260 at the rear end 212 of the trailer for removal and delivery.

Figure 27:
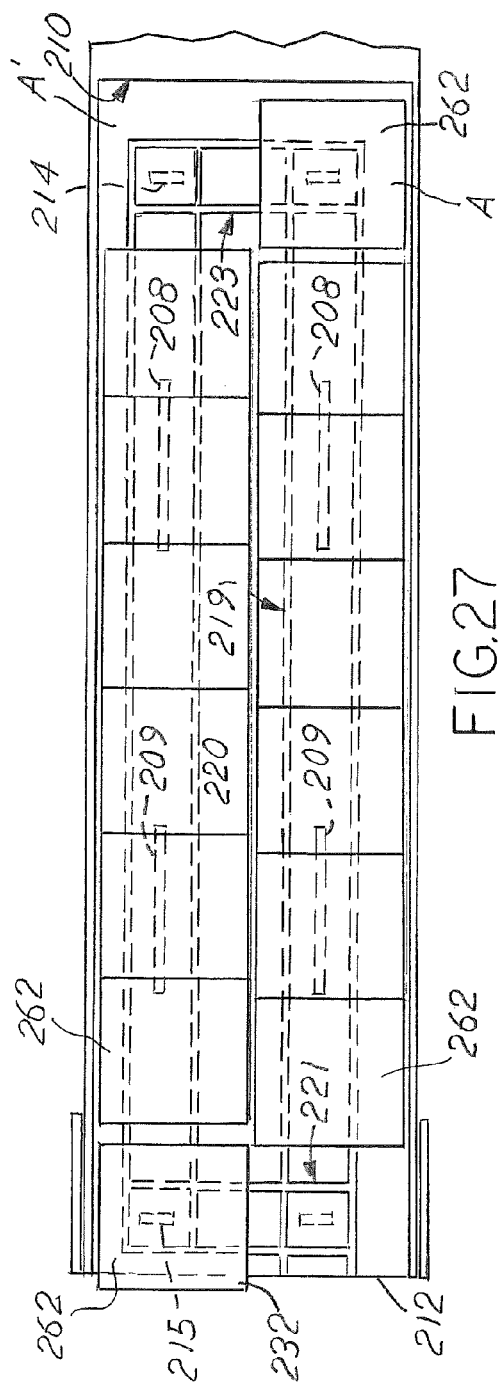
FIG. 27 is a diagrammatic view further illustrating the methodology of use of the mechanism of the invention in order to cycle carriages with pallets thereon and thereby provide for ease of accessibility to the pallets by loading and unloading.

Specifically, an example of such an arrangement is as follows and is diagrammatically depicted in FIGS. 25-27. An example is that of a standard 53 foot trailer.

The internal trailer width of a 53 foot trailer ranges between 98 and 102 inches which poses no problem for the front to rear or rear to front movement on sets of longitudinal tracks 219, 220. However, the internal length of 52 feet, 6.25 inches presents much difficulty for the transverse carriage 260 and pallet movement. It can hold a total of 13 pallets carriages from front to rear on either side or lateral track set; each carriage 260 being 4 feet, 0.25 inches. However, this results in only three inches space to avoid contact between a transverse moving a pallet carriage and an adjacent stationary carriage at either end of the trailer. Such a limit may be inadequate.

The solution can be summarized by steps as follows.

A. The 53 foot trailer doors 300, 302 are typically hinged on the outside of the trailer wall and when opened fully, they rotate 270° back to the outside trailer wall. This leaves the door opening the same width as that of the internal trailer (FIG. 24) and opens the longitudinal space occupied by the trailer doors in the closed position.

B. Four sets of intersecting track housing are installed in sections on the existing trailer floor. Two sets will be elongated, running from front 210 to rear 212 and mounted on either side of the trailer floor 202. The other two sets 221, 223 will run transversely from side to side; one mounted at the front 210 of the trailer floor and the other set at the rear 212.

C. A mechanical stop will be inserted in the outer wall of the rear transverse track 221 at the intersection of each longitudinal track. This will prevent an accidental pallet carriage roll-off during cycling of carriages and pallets.

D. Each parallel set of track housing will be centered exactly two feet apart. (Note: track spacing may vary where pallet size used is less than 48 inches wide.) They will have interlocking supports between each set of track housing, as well as supports tied to the trailer front and sides. The inner track housing of the front to rear sets will also be interlocked at the center of the trailer.

E. An empty trailer space is created by either manually removing an empty pallet carriage at the trailer rear or by utilizing the lift gate 230 onto which a loaded pallet carriage 260 is rolled after the internal tracks have been elevated (FIG. 25).

F. The lift gate 230, if used, is pushed away from the rear of the trailer and lowered.

G. The rear stops, as described for the system, are then engaged to prevent a roll-off of any other pallet carriage 260.

H. The pallet carriage 260 wheels or casters are positioned 12.125 inches in from each side of the carriage 260 and two feet apart to carry equal distribution of weight.

I. The rear track transverse carriage is positioned so that at least three inches of the pallet carriage 260 will overhang the rear 212 of the trailer floor 202 when the elevated pallet carriage 260 is rolling or stationary on the rear transverse tracks 221. This provides the desired additional internal space 224 as demonstrated in FIG. 27 and FIG. 21B for an eight bay bed 202.

J. After an empty space is created, the front and rear actuators 208, 209 on that side simultaneously engage the front and rear pallet carriages 260 and roll to the rear until the rear pallet carriage 260 is fully positioned in the rear of the transverse tracks (FIG. 26). If more than two actuators are installed, all will operate in the same way. This fills the rear empty space and creates a new empty space at the front 210 (FIG. 26).

K. In almost simultaneous motion, the front and rear actuators 208, 209 on the opposite lateral side tracks 220 engage the front and rear carriages 260 and roll all toward the rear 212 until the rear pallet carriage 260 is fully positioned in the rear transverse tracks 221.

L. The front actuator 209 retains its engagement with the front pallet carriage 260 and rolls it forward slightly for alignment onto the front transverse tracks 223.

M. The additional desired space has now been created to allow the front pallet carriage 260 to be rolled transversely on track 223, and contact-free, into the empty space or bay on the opposite front side transverse track 220 by the transverse operating actuator 214.

N. The same process as described in J through M above may be repeated at the rear, where all pallet carriages 260 are rolled toward the front 210 thus creating the additional desired space at the rear 212.

O. When the desired rotation to facilitate loading or unloading is complete, the pallet carriage 260 on the lift gate 230 is reloaded by use of its own linear actuator and all pallet carriages 260 are rolled towards the front 210.

P. Air bags supporting the tracks are now deflated and all pallet carriages 260 are lowered into their resting position.

Q. The rear trailer doors 300, 302 can now be closed to complete the process.

Thus, in the circumstance where the trailer truck has each and every bay, in the examples depicted, filled with carriages 260 and pallets 261 which are loaded, the lift gate 230 can serve as an extra storage bay. With appropriate cyclical movement of the various carriages 260, the creation of a longitudinal space 224 between at least two carriages 260 can be accomplished by carriage 260 movement onto the lift gate 230, creation of a space 224 between adjacent carriages 260 by extension beyond the rear end 212, and by transfer of the carriages 260 to an open lateral bay. The longitudinal space 224 thus can be accommodated by an overhang 232 at the outer or rear end 212 of the trailer.

Of import is the operational movement of the pallets on carriages 260 can be programmed to move in a desired sequence associated with the delivery schedule associated with the cargo of the truck trailer vehicle. Thus, items which must be unloaded at a certain delivery stop can be easily maneuvered from the interior of the trailer to a position on the lift gate for delivery. Alternatively, the lift gate may be maintained at the trailer platform level for transfer of carriages with pallets thereon between trucks which are aligned with the rear lift gate of the trucks facing one another so that the carriage from one truck may be loaded onto the lift gate of the carriage of an adjacent truck. Thus, the rear ends of truck trailers can be aligned so that the tracks on the lift gates are appropriately aligned by maneuvering the trucks into a guide slot.

As a consequence, loads can be transferred between trucks or loads may be discharged in an appropriate and sequential basis at a delivery site. Loads may be placed in open bays and may be added to the trailer interior and positioned at a desired location depending upon the weight and the items stored therein. For example, if refrigeration is required, it may be appropriate and necessary to position carriages with pallets in a certain location within the truck trailer, for example, to connect to pallets within a refrigeration hookup source located within the interior of the trailer.

With respect to all of these operations, the control of the movement of the carriages is an important factor. This is effected by the drive mechanisms chosen to move one or more of the carriages with loaded pallets thereon, both longitudinally and transversely within the trailer. This involves the inclusion of various mechanisms which will effect and control carriage movement. For example, when unloading a trailer it may be necessary to provide brakes or chucks positioned to restrain movement of some of the carriages while enabling movement of other carriages that are palletized. Certain carriages may require stabilizing features such as hooks or latches which will lock the carriage in place while other carriages are being moved. Thus, the array of latches, hooks, actuators, drive mechanisms and mechanisms to provide for appropriate bay location in a trailer, alignment and transfer of carriages of palletized goods between vehicles as well as positioning carriages that are palletized within vehicles and moving the carriages in a desired order to access the items being transported are all enhanced by the use of disclosed controls and mechanisms which facilitate movement and positioning of palletized carriages. Locking carriages in position, moving carriages to and from a lift gate, and arranging the position of the carriages and the contents associated therewith on palletized carriages constitute aspects and objectives of the invention. Further other mechanisms may be utilized to effect carriage movement along tracks such as solenoids positioned to raise or tilt carriage support tracks or cable mechanisms that may ae attached to carriages to effect movement along tracks.

Another feature of the invention is the construction of the tracks which are utilized to support the casters or wheels associated with the carriages. The casters may be supported on flat, planar tracks which elevate to lift the casters and thus the carriages and the various pallets and containers on the carriages upwardly from the lateral sides of the tracks. That is, when flat planar metal tracks are in a lowered position, the bottom portion of the carriages will rest on the lateral sides of the track pathway defined by channels or the sides of channels. Upon inflation of bladders or by lifting of the track by other means, such as a hydraulic piston or a hydraulic pump, the tracks are lifted vertically thereby lifting the carriages and the contents supported thereon. The tracks, however, may have a configuration other than a planar configuration. For example, the tracks may have a V-shaped cross section transverse to the longitudinal direction of the tracks. The cross sectional shape may also be in the form of a concave or other configuration. Such configurations promote alignment of the movement of the casters along the tracks without departing from straight line pathways, particularly at the juncture between transverse and longitudinal track sections. Further or alternatively, the wheels associated with the casters as well as the tracks themselves may have complementary configurations to promote straight line movement in the longitudinal and transverse directions.

FIGS. 28-30 depict an alternative options and construction of the transverse and longitudinal tracks that facilitates transverse movement of carriages 260 along a transverse tracks 221 between 221 longitudinal tracks 219, 220 by modifications at the intersections of the sets of separate tracks.

A typical track construction is depicted in FIG. 28. The construction employs a carriage support system as generally depicted in FIG. 14 and an actuator system generally as depicted in FIGS. 20, 21A and 28. Referring to FIG. 28, there is depicted a diagrammatic view of a track section. A track plate, 500 is supported in a channel 502 by an inflatable bladder 504 which may be inflated to raise track plate 500 from resting on and retention on side walls 503 of the channel 500. In this position an actuator (not shown) may operate to effect movement of the generally ball shaped caster wheel 506, supported on track plate 500.

The track plate 500 is modified at the intersection between tracks that cross to include inclines 510, 512 that slope toward the center of the intersection. The inclines 510 are aligned with the straight line linear direction of the desired movement of caster wheel 206 as directed by an actuator. Inclines 510, 512 may be provided for the transverse track plate 500 as well as an associated longitudinal track plate (e.g. incline 518). An incline slope in the range of 10° to 15° is generally understood to be adequate to enhance the maintenance of straight line movement of a caster wheel 506 along a track plate 500.

To supplement or insure straight linear movement, solenoid actuated gates, such as gates 520, 522, may be incorporated in combination with longitudinal and transverse tracks of the sets of tracks, 219, 220, 221. The solenoid actuated plates or gates would typically be actuated by control signals associated with the programmed movement of carriages 260. Thus the movement of carriages 260 within a truck trailer can be operated to efficiently and effectively move carriages between select storage bays and to maintain the carriages in a fixed location for truck trailer movement.

Figure 32:
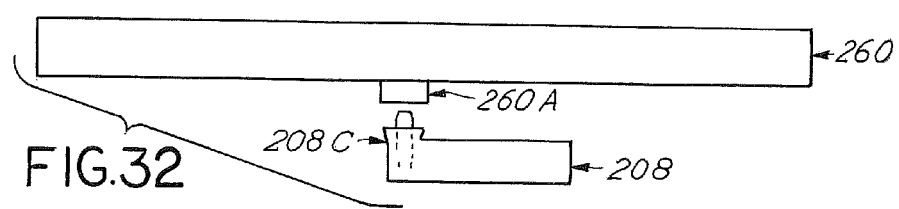
FIG. 32 is a further schematic view of the carriage actuator design of FIG. 31 illustrating an operation function of the actuator.
Figure 31:
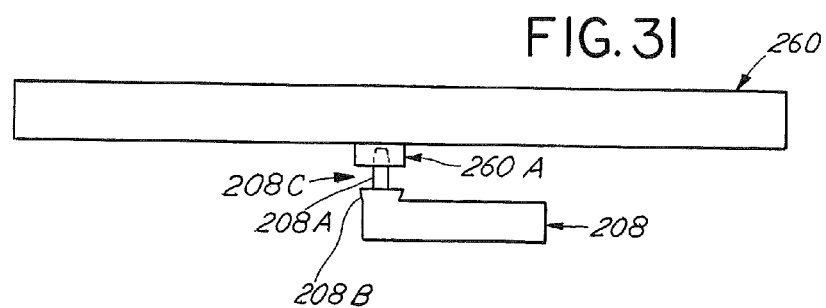
FIG. 31 is a schematic elevation view of a carriage movement actuator design.

The mechanisms for connecting and disconnecting the actuators to the carriages may be varied also. For example, as diagrammatically depicted in FIG. 31 and FIG. 32, a rod 208A which projects from a cylinder 208B comprising an actuator 208 may be programmed to include a feature such as a solenoid 208C wherein as end of the rod extends into a pocket or channel or receptacle 260A associated with the underside of a carriage 260, a solenoid 208C will automatically extend and catch into that channel or pocket 260A. A further action of the solenoid 208C to release the rod and solenoid 208C from the channel or receptacle 260A may be incorporated into the mechanism to effect both catch and for release of the rod from a carriage 260. As an additional aspect, a rod of an actuator 208 may comprise a multisection telescoping construction.

While the foregoing has provided a detailed description of various embodiments of the present invention, it is to be understood that all equivalents recognized by those of ordinary skill in the art are to be encompassed within the scope of the invention as set out in the attached claims.

What is claimed is:

1. In a vehicle for shipping multiple cargo containers having various goods stored therein for dropping off at multiple locations, an enclosed cargo space carried by said vehicle, said cargo space having a front side, a pair of laterally spaced sides, and a rear side movable between open and closed positions for movement of said cargo containers in and out of said open position of said cargo space, said cargo space further having a substantially horizontal floor enclosed between said front side, said laterally spaced sides, and said rear side, an improvement for said shipping vehicle, said improvement comprising, in combination, first and second elongated laterally spaced sets of longitudinal tracks securely mounted along said floor, said elongated spaced sets of tracks being positioned along each of said lateral sides and extending from said front side to said rear side of said cargo space, at least one set of transverse tracks mounted on said floor of said cargo space, said transverse tracks operatively interconnecting said first and second sets of laterally spaced tracks, multiple support carriages having upper and lower sides for supporting each of said cargo containers, each of said support carriages having multiple wheel assemblies secure to the lower sides of said carriages for supporting said cargo containers in a substantially upright position, said wheels being sized and shaped for moveably positioning on said tracks, said carriages being movable on said tracks by engagement of said wheels on said laterally spaced tracks and on said transverse tracks, first and second drive mechanisms operably positioned respectively along said first and second laterally spaced tracks, a third drive mechanism operatively positioned along said transverse tracks, a connection mechanism for operably interconnecting said support carriages to said first, second and third drive mechanisms, and a lifting mechanism for moving said tracks between a raised mobile position for movement by said wheel assemblies of said carriages along said tracks and a lowered immobile position on a seat adjacent said tracks, said carriages when tracks are in the raised mobile position, moveable from one position to another position along said sets of laterally spaced tracks and said transverse tracks by said drive mechanisms.

2. The vehicle of claim 1 further including a lift gate at the rear side of the floor.

3. The vehicle of claim 2 wherein the lift gate is pivotally mounted at the rear side of the floor about an axis.

4. The vehicle of claim 3 wherein the lift gate includes at least one set of spaced tracks aligned with at least one set of said sets of elongated tracks.

5. The vehicle of claim 3 wherein the lift gate includes at least one set of spaced tracks aligned with at least one set of said sets of spaced tracks.

6. The vehicle of claim 3 wherein the lift gate is mounted for transverse movement to the axis.

7. The vehicle of claim 5 wherein the lift gate further includes an outer edge with a retractable retention element.

8. The vehicle of claim 1 wherein in the first, second and third drive mechanisms for the laterally spaced tracks and transverse tracks comprise a chain drive.

9. The vehicle of claim 1 wherein the first, second and third drive mechanisms for the first and second laterally spaced tracks and the transverse tracks comprise telescoping actuators.

10. The vehicle of claim 9 wherein the support carriages comprise pallets and the actuators are pivotally mounted to selectively engage a pallet of said pallets on said first and second set of laterally spaced tracks and said transverse tracks.

11. The vehicle of claim 10 further including locking elements located intermediate the tracks for selectively engaging and retaining a pallet of said pallets in a generally fixed position of a set of said tracks.

12. The vehicle of claim 11 further including a lift gate pivotally mounted at the rear of the floor for pivotal movement about an axis generally transverse to the elongated tracks between a generally horizontal position and a generally vertical position.

13. The vehicle of claim 12 wherein said lift gate includes at least one set of lift gate tracks aligned with at least one set of said elongated tracks and wherein said lift gate is sized to receive and support at least one said carriage on said lift gate tracks.

14. The vehicle of claim 13 wherein said lift gate is mounted for movement at the rear end transversely to said elongated tracks on said floor to provide movement of a carriage between said sets of said elongated tracks.

15. The vehicle of claim 13 wherein said lift gate includes an outer edge with a retractable retention element.

16. The vehicle of claim 13 further including guide members located along the sets of tracks for guiding carriage movement along said sets of tracks.

17. The vehicle of claim 16 wherein said guide members are selectively positionable.

18. The vehicle of claim 16 wherein said actuators, locking elements, guide members and all said sets of tracks are arrayed to define multiple adjacent, generally uniformly sized carriage location bays.

19. The vehicle of claim 18 wherein the carriage location bays comprise a first and a second series of adjacent bays extending along the first and second laterally spaced sets of tracks between the front and rear end of the floor and further wherein the transverse tracks are located at the front end of the floor intermediate bays of said first and second sets of tracks.

20. The vehicle of claim 1 further including a lift gate at the rear end of the floor, said lift gate including a set of lift gate tracks aligned with at least one set of longitudinal tracks, said lift gate tracks providing a bay for support of at least one carriage thereof, said at least one bay spaced from the rear side of said floor and a carriage retention mechanism on the lift gate for maintaining a said carriage supported on said lift gate spaced from the rear side of said floor.

21. The vehicle of claim 20 comprising a plurality of serial carriage bays in said vehicle on at least one of said longitudinal sets of tracks, said bays arrayed between the front side and the rear side and collectively having a longitudinal dimension less than the distance between the front side and rear side, whereby the longitudinal drive mechanisms enable positioning at least two of the serial plurality of carriages separated from each other.

22. The vehicle of claim 1 including a first set and a second set of carriage bays, said first set of bays including said first set of longitudinal tracks, said second set of bays including said second set of tracks, said first and second sets of tracks having a longitudinal axis, said axes extending from the front to the rear side of said floor and parallel, said first set of tracks and said second set of tracks each having a longitudinal dimension, each bay having a longitudinal dimension parallel to the track axes, said longitudinal dimension of each of said bays being equal, and the cumulative longitudinal dimensions of each of the first and second set of bays being equal and greater than at least one of said longitudinal dimensions of said first and second tracks.

23. The vehicle of claim 22 wherein a bay of said first set and second set extend axially beyond the rear side.

* * * * *